United States Patent
Oishi

(10) Patent No.: US 8,457,189 B2
(45) Date of Patent: Jun. 4, 2013

(54) RECEIVING APPARATUS HAVING EQUALIZER, AND RECEIVING METHOD

(75) Inventor: Syouji Oishi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 924 days.

(21) Appl. No.: 12/182,822

(22) Filed: Jul. 30, 2008

(65) Prior Publication Data

US 2009/0097540 A1 Apr. 16, 2009

(30) Foreign Application Priority Data

Oct. 11, 2007 (JP) ................... 2007-265520

(51) Int. Cl.
*H03K 5/159* (2006.01)
(52) U.S. Cl.
USPC ........... 375/232; 375/324; 375/326; 375/339; 375/340; 375/344
(58) Field of Classification Search
USPC ................ 375/229–235, 316, 324, 340, 346, 375/326, 339, 344
See application file for complete search history.

(56) References Cited

U.S. PATENT DOCUMENTS

| | | | | |
|---|---|---|---|---|
| 6,023,491 A | * | 2/2000 | Saka et al. | 375/326 |
| 6,868,131 B2 | * | 3/2005 | Ohishi | 375/326 |
| 6,968,001 B2 | * | 11/2005 | Jayaraman et al. | 375/231 |
| 7,072,783 B2 | * | 7/2006 | Makhlouf et al. | 702/69 |
| 8,077,806 B2 | * | 12/2011 | Nawa et al. | 375/326 |

FOREIGN PATENT DOCUMENTS

| | | |
|---|---|---|
| JP | 5-130152 | 5/1993 |
| JP | 2000-270036 A | 9/2000 |
| JP | 2002-158724 A | 5/2002 |
| JP | 2007-201729 | 8/2007 |

OTHER PUBLICATIONS

Japanese Office Action mailed Dec. 6, 2011 for corresponding Japanese Application No. 2007-265520, with English-language translation.

* cited by examiner

*Primary Examiner* — Sophia Vlahos
(74) *Attorney, Agent, or Firm* — Fujitsu Patent Center

(57) ABSTRACT

A timing recovery circuit recovers the symbol timing of a modulation signal. A carrier recovery circuit corrects the frequency shifts of output signals of the timing recovery circuit. An FIR equalizer having a plurality of taps, and corrects the distortions of output signals of the carrier recovery circuit. A control circuit dynamically controls the number of taps used in the FIR equalizer.

10 Claims, 23 Drawing Sheets

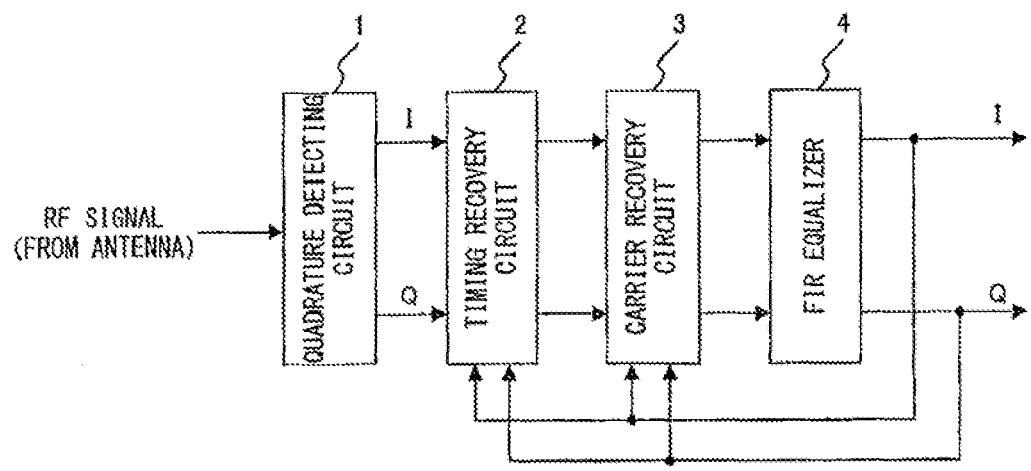
F I G. 1

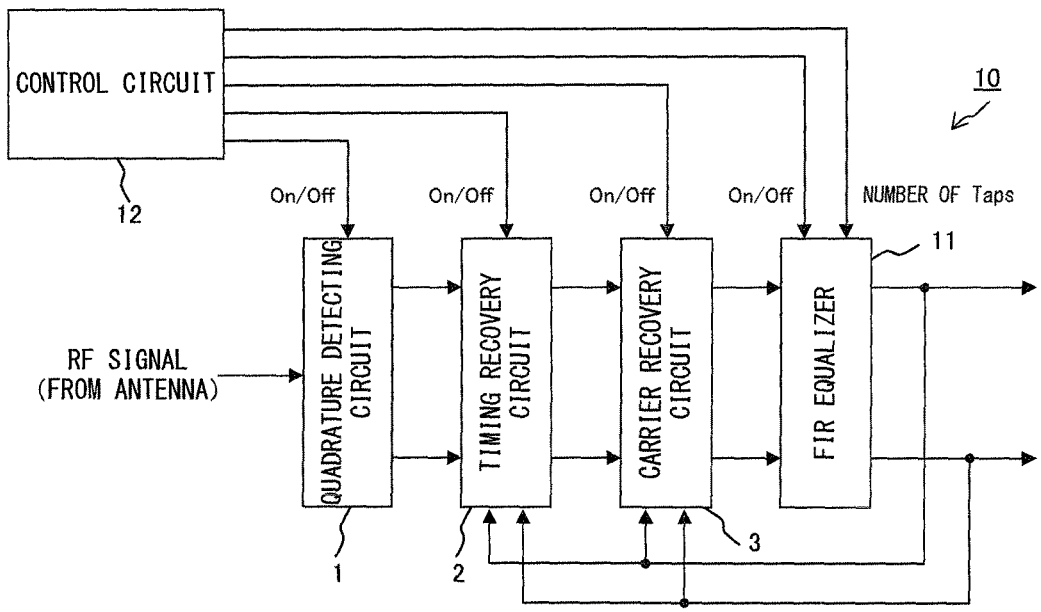
F I G. 3

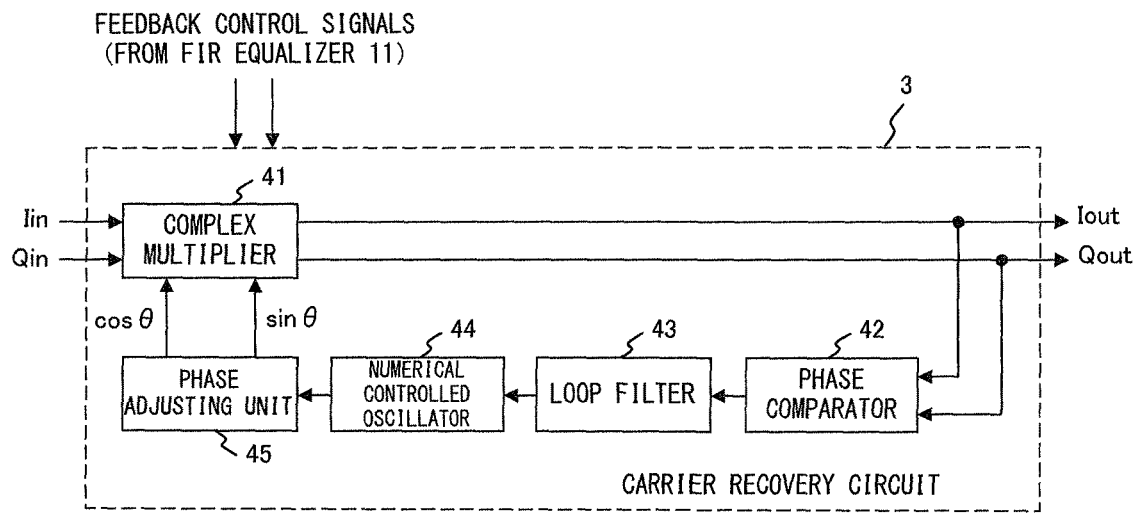
F I G. 7

Δt=SMALL, ΔP=SMALL

Δt=SMALL, ΔP=LARGE

Δt=LARGE, ΔP=SMALL

Δt=LARGE, ΔP=LARGE

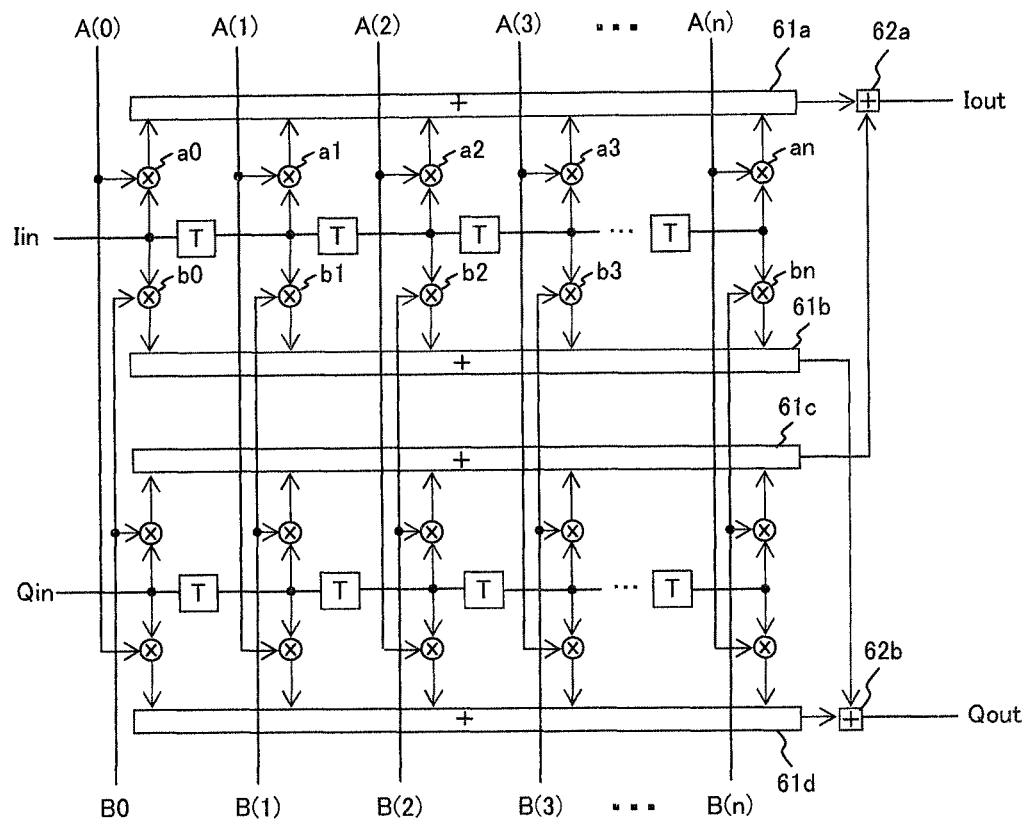
F I G. 10

F I G. 1 1 A

F I G. 1 1 B

| I | Q | Di | Dq | Ei | Eq |
|---|---|---|---|---|---|
| I>=0 | Q>=0 | +16 | +16 | -1×(I-Di) | -1×(Q-Dq) |
| I>=0 | Q<0 | +16 | -16 | | |
| I<0 | Q>=0 | -16 | +16 | | |
| I<0 | Q<0 | -16 | -16 | | |

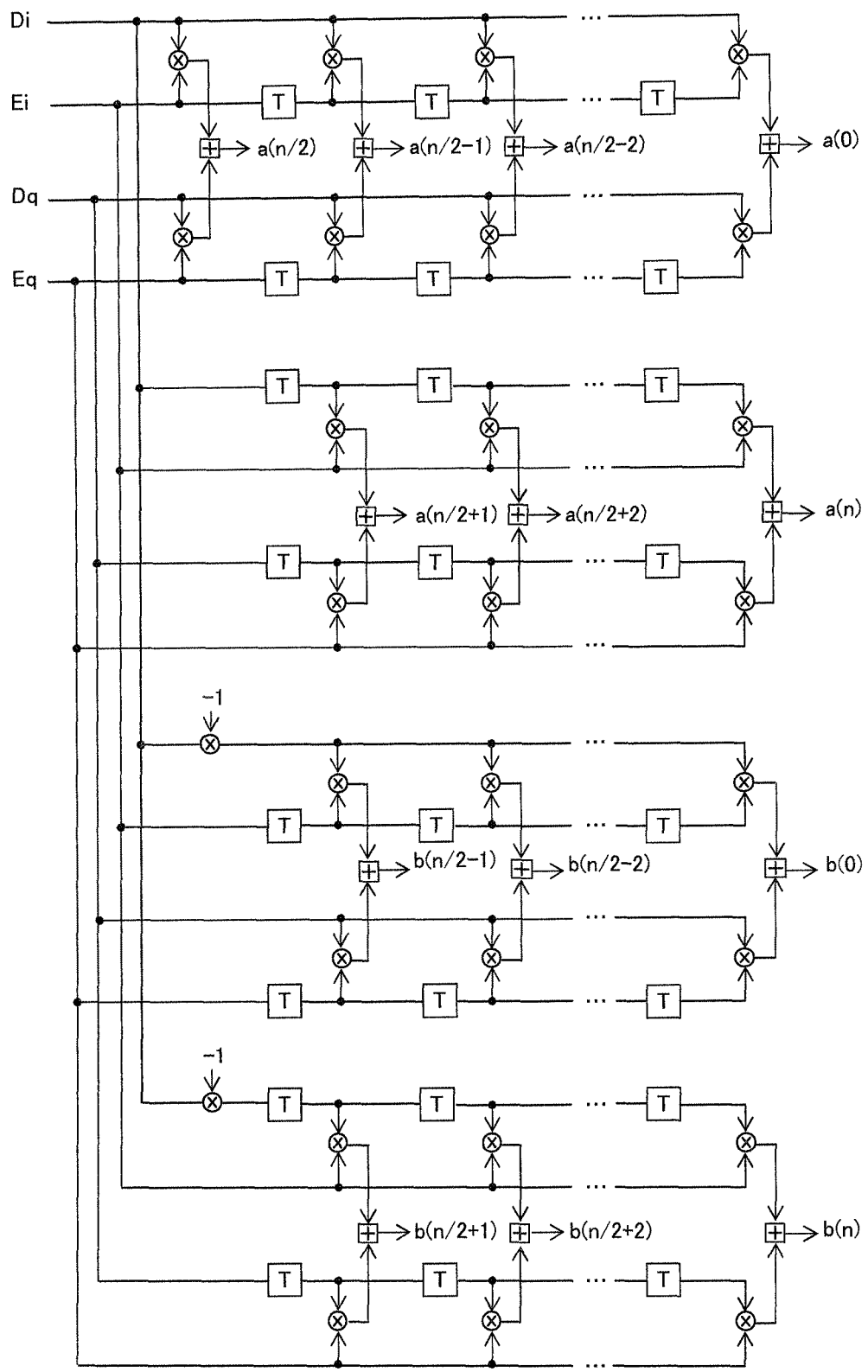
F I G. 1 3

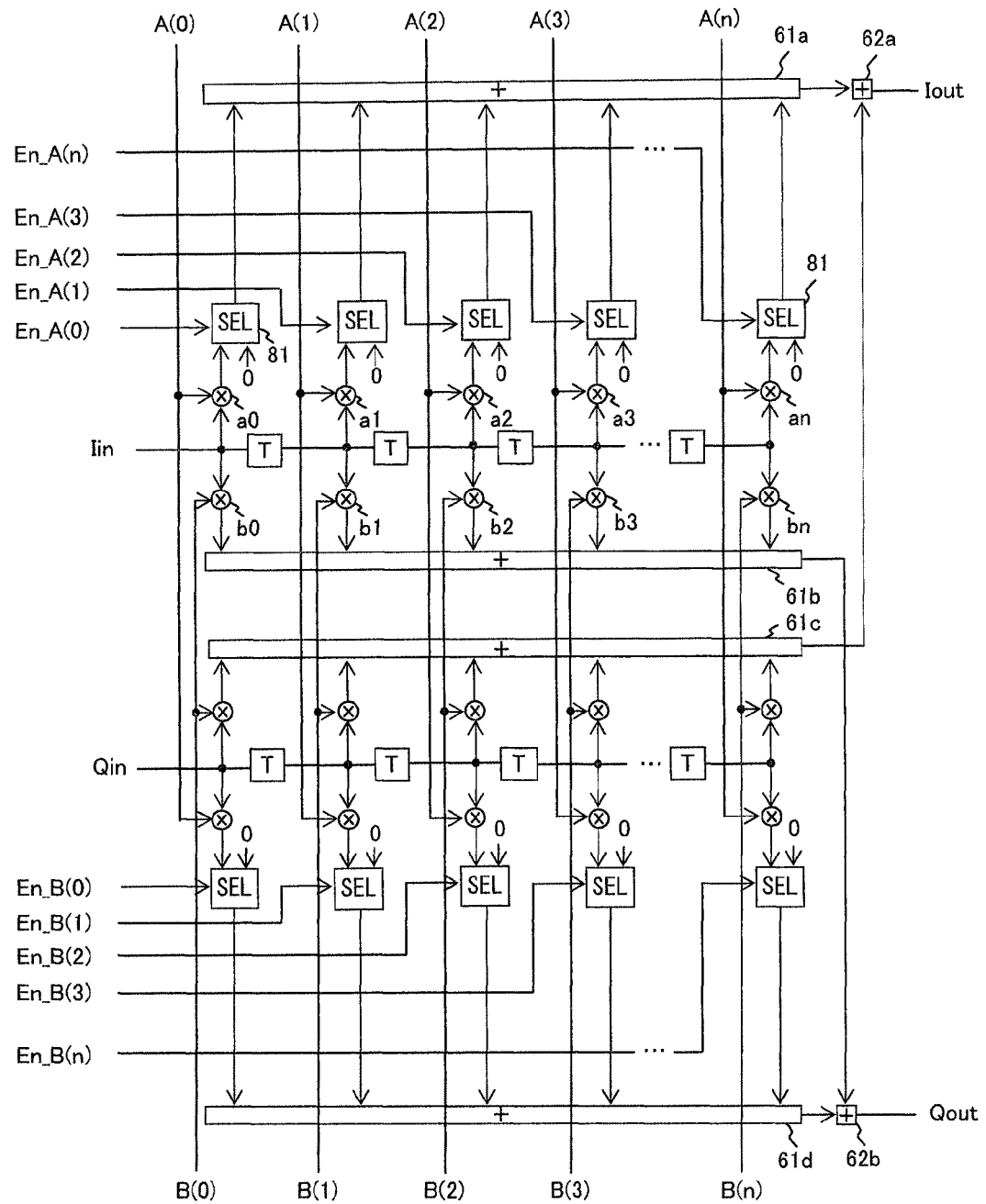
F I G. 1 4

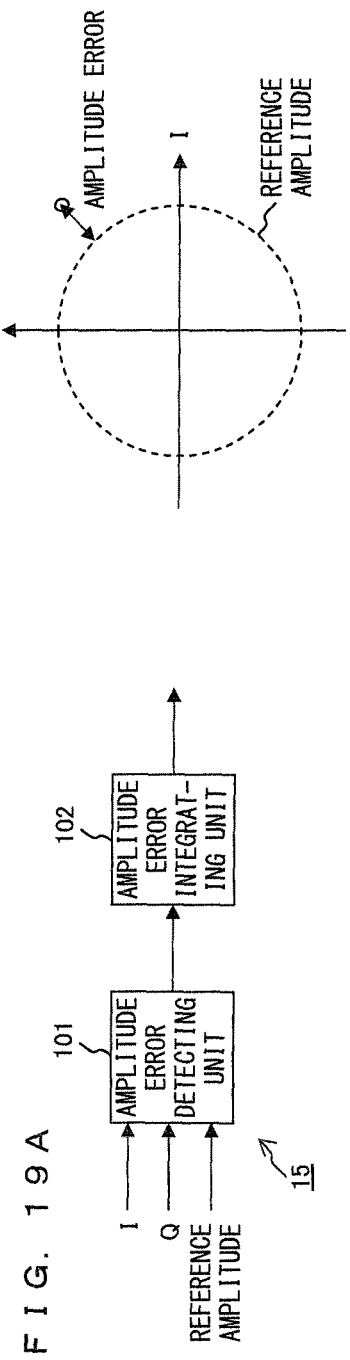

IN CASE OF LOW C/N

IN CASE OF HIGH C/N

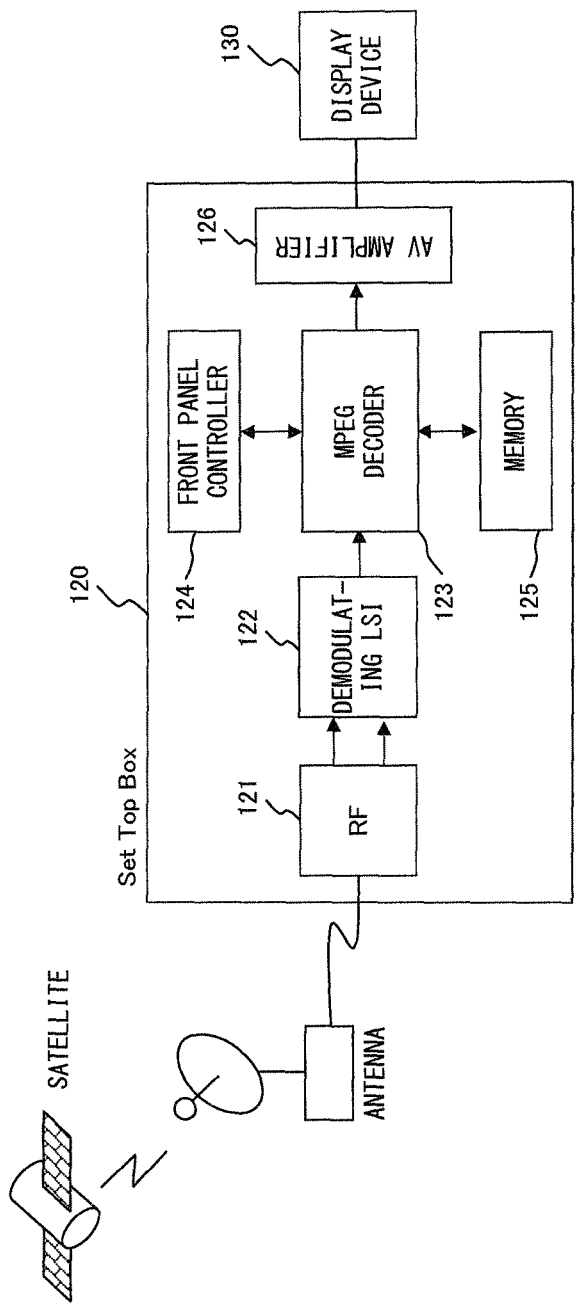
F I G. 2 3

RECEIVING APPARATUS HAVING EQUALIZER, AND RECEIVING METHOD

CROSS REFERENCE TO RELATED APPLICATIONS

This application is based upon and claims the benefit of priority from the prior Japanese Patent Application No. 2007-265520, filed on Oct. 11, 2007, the entire contents of which are incorporated herein by reference.

BACKGROUND OF THE INVENTION

1. Field

The embodiments relate to a receiving apparatus for receiving a modulation signal, and may be applied to, for example, a PSK demodulating apparatus having an equalizer for correcting a distortion of a signal.

2. Description of the Related Art

PSK (Phase Shift Keying) has been widely put into practice use as one of digital modulation methods. PSK is a modulation method for changing the phase of a carrier wave in accordance with transmission data, and widely used in fields such as a satellite communication, etc.

FIG. 1 is a block diagram showing a configuration of a general PSK demodulating apparatus. The PSK demodulating apparatus receives and demodulates a PSK (BPSK, QPSK, 8PSK, etc.) modulation signal.

A quadrature detecting circuit 1 obtains I-Q channel signals of the PSK modulation signal from an RF input signal. I-channel signal and Q-channel signal are respectively digitized and output. A timing recovery circuit 2 recovers the symbol timing of the I-Q channel signals. A carrier recovery circuit 3 recovers a carrier by correcting the frequency shifts of received signals. An FIR equalizer 4 corrects the distortions of the I-Q channel signals. Here, the timing recovery circuit 2 and the carrier recovery circuit 3 can respectively recover timing and a carrier by using signals the distortions of which are corrected by the FIR equalizer 4.

Patent Document 1 (Japanese Patent Publication No. 2002-158724) discloses a PSK demodulating apparatus comprising the following circuits. A digital signal generating circuit generates a digital signal corresponding to a phase axis by performing an analog-to-digital conversion after the coherent detection of a modulated input signal. A frequency correction value outputting circuit outputs a frequency correction value set based on a symbol rate. A frequency correcting circuit generates a frequency-corrected signal by applying a frequency offset to the digital signal on the basis of the frequency correction value. A timing recovery circuit recovers timing by extracting the symbol timing of the frequency-corrected signal. A C/N detecting circuit detects C/N from the symbol obtained by the timing recovery circuit. An optimum frequency correction value determining circuit outputs as an optimum frequency correction value a frequency correction value in the case where the C/N is the highest. A carrier recovery circuit recovers a carrier by correcting the frequency shift of the signal the frequency of which is corrected with the optimum frequency correction value, and the timing of which is recovered. A coherent detection circuit corrects an error of the symbol after the carrier is recovered, and detects a unique word.

In the PSK demodulating apparatus shown in FIG. 1, the FIR equalizer 4 sometimes diverges if a frequency shift (here, a difference between the frequency of the carrier wave and that of a sinusoidal wave used for quadrature detection in the demodulating apparatus) is large. One solution to this problem is, for example, a procedure for suspending the FIR equalizer 4 at the start of reception as represented by the flowchart shown in FIG. 2. Namely, in step S101, the timing recovery circuit 2 and the carrier recovery circuit 3 are operated, and at the same time, the FIR equalizer 4 is suspended. The carrier recovery circuit 3 corrects a frequency shift in this state. After the frequency shift is corrected by the carrier recovery circuit 3, the FIR equalizer 4 is operated.

With this procedure, however, the carrier recovery circuit 3 operates in the state where the FIR equalizer 4 is suspended. Therefore, the convergence time of the timing recovery circuit 2 and/or the carrier recovery circuit 3 sometimes increases if a distortion of an input signal is large.

As described above, it is difficult in the conventional technology to achieve both of stable demodulation of a distorted input signal, and a reduction in the convergence time of an initial operation.

SUMMARY

According to an aspect of an embodiment, a receiving apparatus includes a timing recovery circuit for recovering symbol timing of a modulation signal, a carrier recovery circuit for correcting a frequency shift of an output signal of the timing recovery circuit, a digital equalizer, which includes a plurality of taps, for correcting a distortion of an output signal of the carrier recovery circuit, and a control circuit for dynamically controlling the number of taps used in the digital equalizer.

BRIEF DESCRIPTION OF THE DRAWINGS

FIG. 1 is a block diagram showing a configuration of a general PSK demodulating apparatus;

FIG. 3 is a block diagram showing a configuration of a receiving apparatus according to an embodiment of the present invention;

FIG. 7 is a block diagram showing a configuration of a carrier recovery circuit;

FIG. 10 is a diagram showing a fundamental configuration of a complex FIR filter;

FIG. 13 is a diagram showing a configuration of a computing unit in the tap coefficient computing unit;

FIG. 14 is a diagram showing a configuration of a complex FIR filter having a function to change the number of taps;

FIGS. 19A to 19C are schematic diagrams for explaining a configuration and operations of a C/N detecting circuit;

FIG. 23 is a block diagram showing a configuration of a satellite broadcasting receiving system according to the embodiments.

DESCRIPTION OF THE EMBODIMENTS

Figure 2:
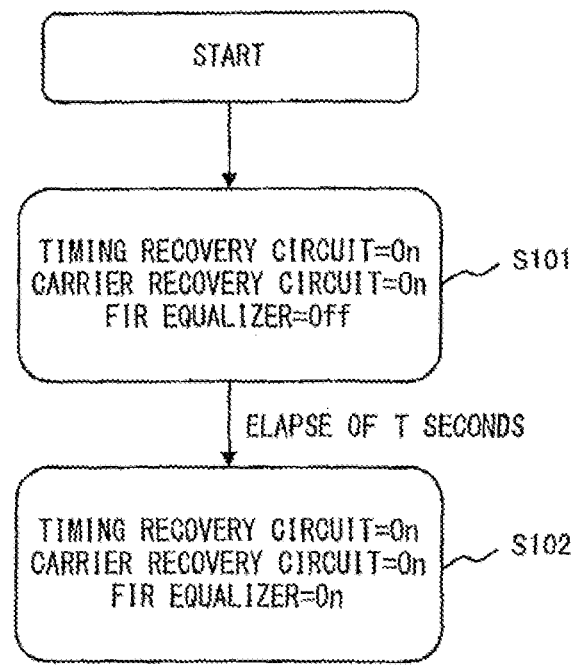
FIG. 2 is a flowchart showing an operational procedure at the start of reception in conventional technology.

A receiving apparatus according to an embodiment includes a timing recovery circuit for recovering symbol timing of a modulation signal, a carrier recovery circuit for correcting a frequency shift of an output signal of the timing recovery circuit, a digital equalizer, which includes a plurality of taps, for correcting a distortion of an output signal of the carrier recovery circuit, and a control circuit for dynamically controlling the number of taps used in the digital equalizer.

In the receiving apparatus having the above described configuration, a distortion of a signal cannot be fully corrected if the number of taps used in the digital equalizer is small, leading to an increase in the convergence time of the system. In the meantime, the system can possibly diverge if the number of taps used in the digital equalizer is too large. With the receiving apparatus and receiving method according to the embodiment, the number of taps used in the digital equalizer is dynamically controlled, thereby implementing a stable reception operation and short convergence time. Namely, the receiving apparatus for receiving a modulation signal can stably receive a modulation signal while suppressing the convergence time of an initial operation.

The receiving apparatus according to the embodiment may further includes a C/N detecting circuit for detecting the C/N of an output signal of the digital equalizer. In this case, the control circuit increments the number of taps used in the digital equalizer in accordance with the C/N detected by the C/N detecting circuit. If the C/N is favorable, the convergence time of the system can be further reduced by increasing the increment speed of the number of taps.

FIG. 3 is a block diagram showing a configuration of the receiving apparatus according to the embodiment. This receiving apparatus 10 receives a modulation signal. The modulation signal is a PSK modulation signal in this embodiment although it is not particularly limited. The PSK modulation is, for example, BPSK, QPSK, 8PSK, etc. The receiving apparatus 10 demodulates a received modulation signal. Namely, the receiving apparatus 10 serves as a modulator (a PSK modulator in this embodiment).

A quadrature detecting circuit 1 obtains I-Q channel signals of the PSK modulation signal from an RF input signal. Although the input signal is not particularly limited, it is, for example, a radio signal of a satellite communication, and received via an antenna. Additionally, the quadrature detecting circuit 1 detects a signal by using a sinusoidal wave having almost the same frequency as a carrier wave. Namely, quasi-synchronous quadrature detection is made. The I-channel signal and Q-channel signal are respectively digitized and output. The timing recovery circuit 2 recovers the symbol timings of the I-Q channel signals. The carrier recovery circuit 3 corrects frequency shifts of the I-Q channel signals the timings of which are recovered.

An FIR equalizer 11 has a complex FIR filter, and corrects distortions of the I-Q channel signals the frequency shifts of which are corrected. The timing recovery circuit 2 and the carrier recovery circuit 3 can respectively recover timings and correct a frequency by using the output signals of the FIR equalizer 11.

The control circuit 12 controls the operation states (ON/OFF) of the quadrature detecting circuit 1, the timing recovery circuit 2, the carrier recovery circuit 3, and the FIR equalizer 11. Additionally, the control circuit 12 can dynamically control the number of taps used by the FIR equalizer 11. Here, "the number of taps" indicates the number of taps used by the complex FIR filter of the FIR equalizer 11. If a distortion of a reception signal is large (namely, if the signal is deteriorated), the number of taps used by the FIR equalizer 11 must be normally large. The number of taps used by the FIR equalizer 11 must be normally large also if a distortion of a reception signal is corrected with high precision. However, the computation results of the FIR equalizer 11 are more prone to diverge if the number of taps used by the FIR equalizer 11 is incremented. For this reason, the control circuit 12 suitably determines the number of taps used by the FIR equalizer 11.

Figure 4:
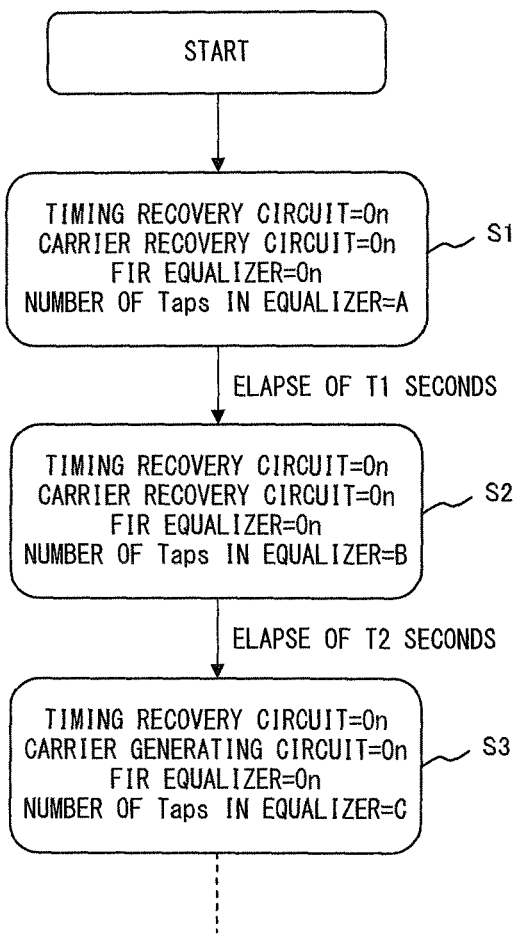
FIG. 4 is a flowchart showing the fundamental operations of the receiving apparatus according to the embodiment.

FIG. 4 is a flowchart showing the fundamental operations of the receiving apparatus 10 according to the embodiment. The process of this flowchart is executed by the control circuit 12 at the start of reception of a modulation signal (or at the power-up of the receiving apparatus) in this embodiment.

In step S1, the timing recovery circuit 2, the carrier recovery circuit 3, and the FIR equalizer 11 are set to ON. Additionally, the number of taps used by the FIR equalizer 11 is set to "A". As a result, the FIR equalizer 11 operates with "the number of taps=A". "A" is a predetermined integer. Furthermore, a timer is activated to measure a "time T1". As a result of executing step S1, the timing recovery circuit 2 starts to recover timings, and the carrier recovery circuit 3 starts to correct a frequency. Moreover, the FIR equalizer 11 starts to correct a distortion with "the number of taps=A".

When the timer expires after the time T1 elapses, the number of taps used by the FIR equalizer 11 is set to "B" in step S2. As a result, the FIR equalizer 11 operates with "the number of taps=B". "B" is an integer larger than "A". Then, the timer is reactivated to measure a "time T2".

Similarly, when the timer expires after the time T2 elapses, the number of taps used by the FIR equalizer 11 is set to "C" in step S3. As a result, the FIR equalizer 11 operates with "the number of taps=C". "C" is an integer larger than "B". Thereafter, the number of taps used by the FIR equalizer 11 is incremented step by step to its maximum number. After the number of taps used by the FIR equalizer 11 reaches the maximum number, the receiving apparatus 10 receives a modulation signal in a normal operation mode.

As described above, the number of taps used by the FIR equalizer 11 at the start of reception of a modulation signal is incremented gradually as time elapses in the receiving apparatus 10 according to the embodiment. Namely, the number of taps used by the FIR equalizer 11 is small at the time of start of reception. Therefore, the computation results of the FIR equalizer 11 are easy to converge, and a stable reception operation can be implemented. Additionally, since a distortion of a signal is corrected to a certain extent by the FIR equalizer 11 immediately after the start of reception, the lock time of the timing recovery circuit 2 and/or the carrier recovery circuit 3, to which the output signals of the FIR equalizer 11 are fed back, is reduced.

Suitable values are assumed to be predetermined, for example, with a simulation, etc. respectively as the numbers of taps "A", "B", "C", ..., and the times "T1", "T2", .... Alternatively, the times "T1", "T2", ... may be defined with the number of symbols.

Figure 5:
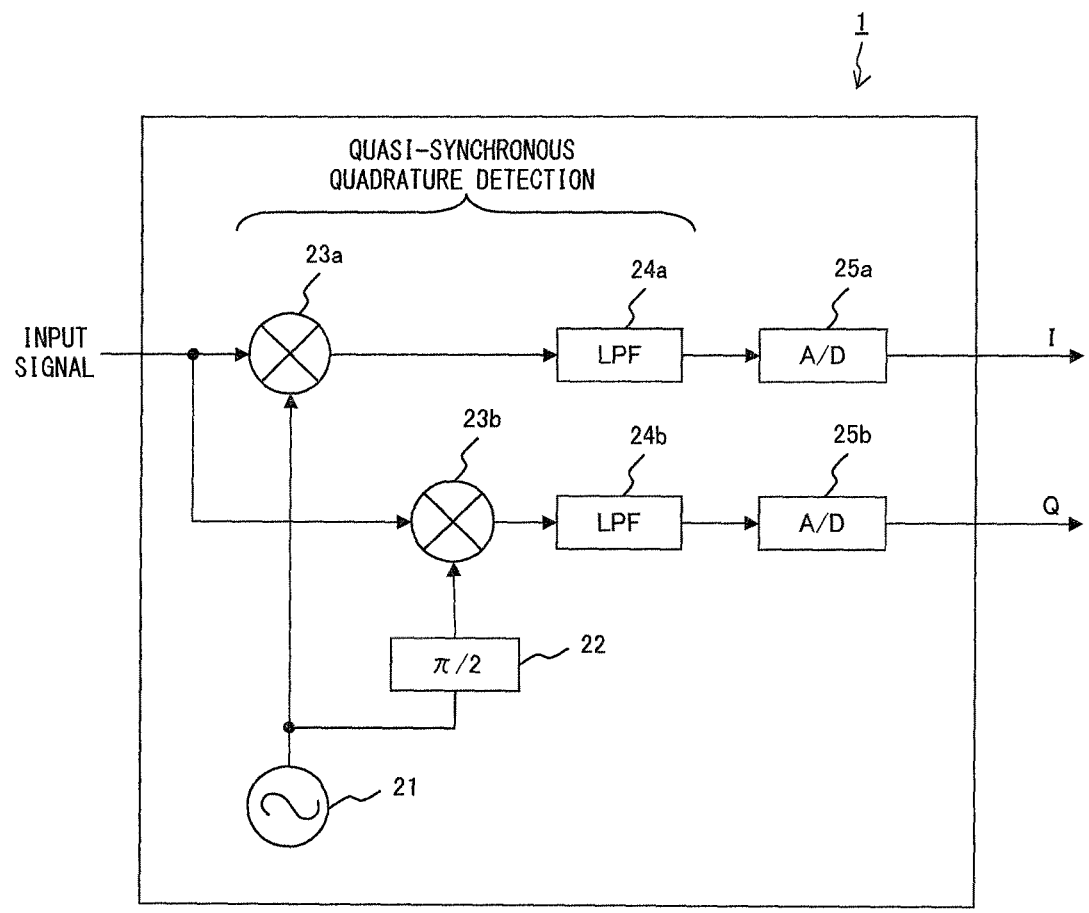
FIG. 5 is a block diagram showing a configuration of a quadrature detecting circuit.

FIG. 5 is a block diagram showing a configuration of the quadrature detecting circuit 1. The quadrature detecting circuit 1 includes a local oscillator 21, a π/2 phase shifter 22, multipliers 23a and 23b, low-pass filters (LPFs) 24a and 24b, and A/D converters 25a and 25b in this embodiment.

The local oscillator 21 generates an oscillation signal of almost the same frequency as the carrier wave of a modulation signal. The oscillation signal is, for example, a sinusoidal wave. However, since the local oscillator 21 oscillates independently of an oscillator of a transmitting apparatus, a frequency shift exists between the carrier wave and the oscillation signal. The π/2 phase shifter 22 shifts the phase of the oscillation signal by π/2. The multipliers 23a and 23b respectively multiply an input signal by the oscillation signal. A shift of π/2 exists between the phases of the oscillation signals provided to the multipliers 23a and 23b. Accordingly, the I-axis component and the Q-axis component (hereinafter referred to as I-channel signal and Q-channel signal) of the modulation signal are detected. The low-pass filters 24a and 24b respectively transmit low-frequency components of the output signals of the multipliers 23a and 23b. The A/D converters 25a and 25b respectively convert the output signals of the low-pass filters 24a and 24b into digital data.

As described above, the quadrature detecting circuit 1 outputs digital data of the I-Q channel signals. Namely, the quasi-synchronous detection of a PSK modulation signal is made.

Figure 6:
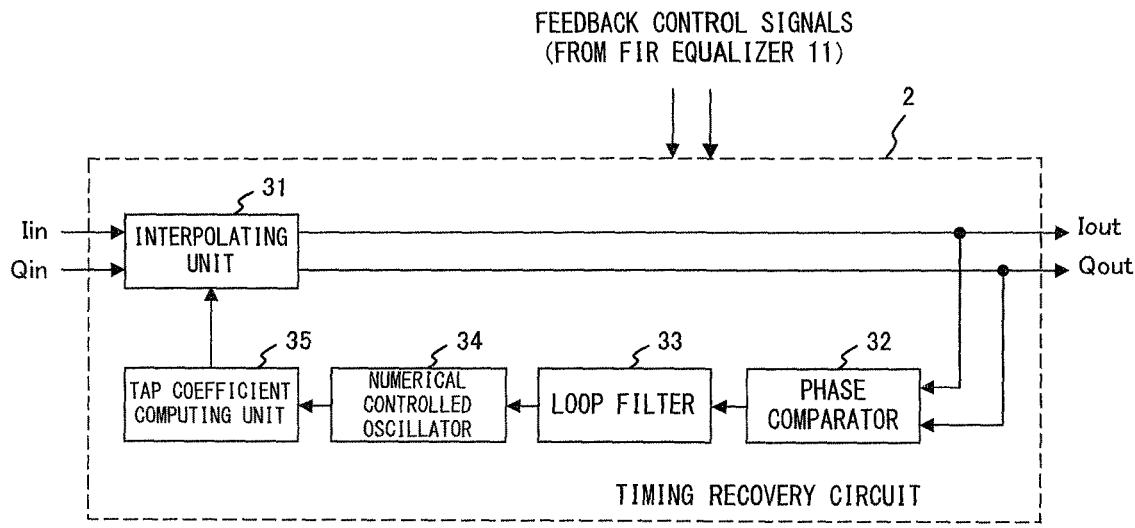
FIG. 6 is a block diagram showing a configuration of a timing recovery circuit.

FIG. 6 is a block diagram showing a configuration of the timing recovery circuit 2. The timing recovery circuit 2 includes an interpolating unit 31, a phase comparator 32, a loop filter 33, a numerical controlled oscillator 34, and a tap coefficient computing unit 35. The timing recovery circuit 2 recovers symbol data by recovering symbol timing.

To the interpolating unit 31, I-Q channel signals are input from the quadrature detecting circuit 1. The interpolating unit 31 includes an FIR filter, and recovers the symbol timings of the I-Q channel signals. As a result, I-channel data and Q-channel data at suitable timings are recovered. Tap coefficients of the FIR filter are provided from the tap coefficient computing unit 35. The phase comparator 32 detects a phase error of an input signal with respect to an ideal phase. The loop filter 33 smoothes the output signal of the phase comparator 32. The numerical controlled oscillator (NCO) 34 oscillates at a frequency corresponding to the output signal of the loop filter 33. The oscillation frequency is equivalent to a frequency difference between the symbol rate of an input signal and the sampling frequency of the A/D converter.

The output of the numerical controlled oscillator 34 increases or decreases almost linearly as time elapses, and is reset in a cycle corresponding to the oscillation frequency. The tap coefficient computing unit 35 generates a tap coefficient in accordance with the output value of the numerical controlled oscillator 34, and provides the generated tap coefficient to the interpolating unit 31.

The timing recovery circuit 2 can use the output signals (namely, the I-Q channel signals the distortions of which are corrected) of the FIR equalizer 11 as feedback control signals. In this case, for example, input signals to the interpolating unit 31 may be corrected with the feedback control signals. Alternatively, a tap coefficient obtained by the tap coefficient computing unit 35 may be corrected with the feedback control signals. In either case, the precision of timing recovery (or the precision of symbol data recovery) made by the timing recovery circuit 2 is improved by this feedback control. Even if an input signal is distorted, the lock time of the timing recovery circuit 2 at an initial operation is reduced.

FIG. 7 is a block diagram showing a configuration of the carrier recovery circuit 3. The carrier recovery circuit 3 includes a complex multiplier 41, a phase comparator 42, a loop filter 43, a numerical controlled oscillator 44, and a phase adjusting unit 45. The carrier recovery circuit 3 corrects frequency shifts of I-Q channel signals.

To the complex multiplier 41, the I-Q channel signals the timings of which are recovered by the timing recovery circuit 2 are input. The complex multiplier 41 shifts the phase of a modulation signal by θ by multiplying the I-channel signal and Q-channel signal respectively by a cos θ signal and a sin θ signal. As a result, the frequency of the input signal is adjusted. The cos θ signal and the sin θ signal are provided from the phase adjusting unit 45. The operations of the phase comparator 42, the loop filter 43, and the numerical controlled oscillator 44 are analogous to those of the phase comparator 32, the loop filter 33, and the numerical controlled oscillator 34 of the timing recovery circuit 2. Namely, the phase comparator 42 detects the phase error of an input signal with respect to an ideal phase. The loop filter 43 smoothes the output signal of the phase comparator 42. The numerical controlled oscillator 44 oscillates at a frequency corresponding to the output signal of the loop filter 43. This oscillation frequency is equivalent to a frequency shift (namely, a difference between the frequency of the carrier wave and the oscillation frequency of the local oscillator). The phase adjusting unit 45 generates the cos θ signal and the sin θ signal in accordance with the output value of the numerical controlled oscillator 44.

The carrier recovery circuit 3 can use the output signals (namely, the I-Q channel signals the distortions of which are corrected) of the FIR equalizer 11 as feedback control signals. In this case, for example, input signals to the complex multiplier 41 may be corrected with the feedback control signals. Alternatively, the cos θ signal and the sin θ signal, which are obtained by the phase adjusting unit 45, may be corrected with the feedback control signals. In either case, the precision of frequency adjustment made by the carrier recovery circuit 3 is improved with this feedback control. Even if input signals are distorted, the lock time of the carrier recovery circuit 3 at an initial operation is reduced.

Figure 8:
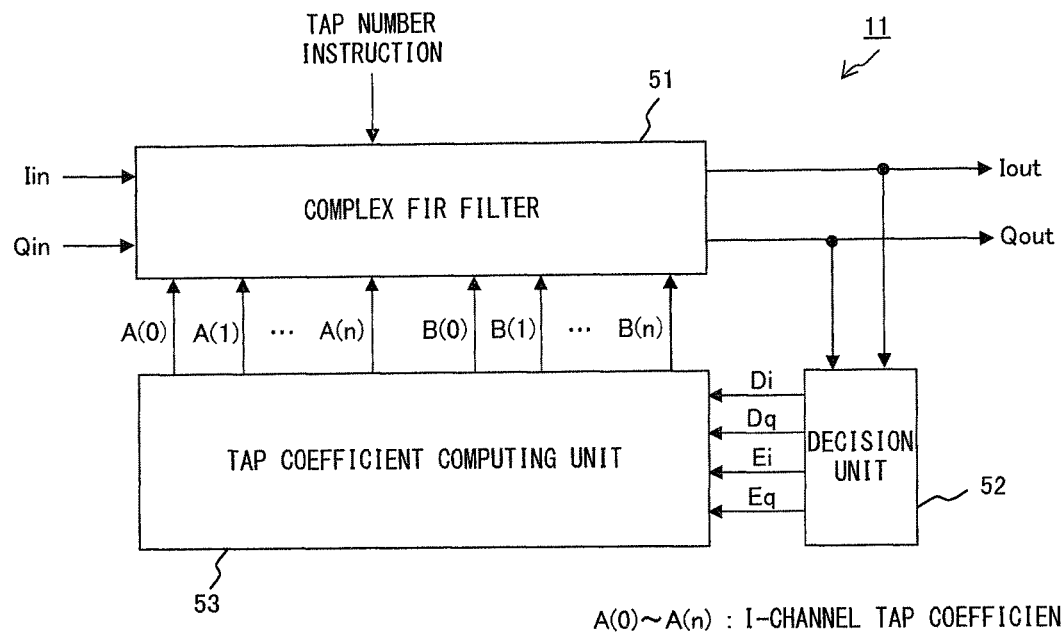
FIG. 8 is a block diagram showing a configuration of an FIR equalizer.

FIG. 8 is a block diagram showing a configuration of the FIR equalizer 11. The FIR equalizer 11 includes a complex FIR filter 51, an decision unit 52, and a tap coefficient computing unit 53. The FIR equalizer 11 corrects distortions of I-Q channel signals.

To the complex FIR filter 51, the I-Q channel signals the frequency shifts of which are corrected by the carrier recovery circuit 3 are input. Additionally, the number of taps in the complex FIR filter 51 is "n+1". The complex FIR filter 51 corrects distortions of the I-Q channel signals in accordance with tap coefficients A(0) to A(n), and B(0) to B(n), which are provided from the tap coefficient computing unit 53. Note that, however, the number of taps actually used by the complex FIR filter 51 is determined in accordance with a tap number instruction. The tap number instruction is generated by the control circuit 12.

The decision unit 52 detects the amounts of distortions of input signals to the complex FIR filter 51. Detection results of the decision unit 52 are output as an I-channel decision signal (Di), a Q-channel decision signal (Dq), an I-channel error signal (Ei), and a Q-channel error signal (Eq). The tap coefficient computing unit 53 generates the tap coefficients A(0) to A(n) and B(0) to B(n) on the basis of the detection results of the decision unit 52. The tap coefficients are determined so that errors detected by the decision unit 52 are minimized.

Figure 9A:
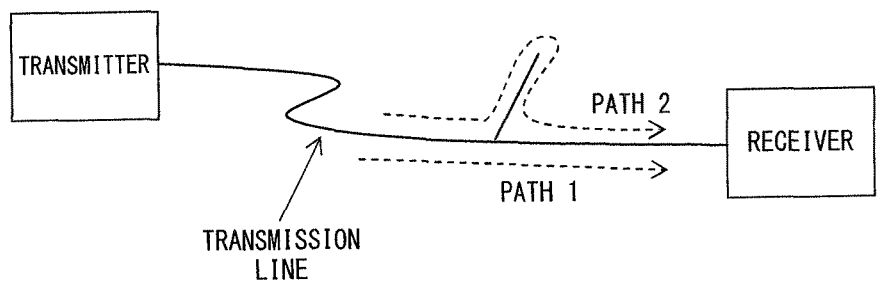
FIGS. 9A to 9E are schematic diagrams for explaining a distortion of a transmission signal.

FIGS. 9A to 9E are schematic diagrams for explaining a distortion of a transmission signal. The following description assumes that the signal is transmitted from a transmitter to a receiver via a path 1 as shown in FIG. 9A. Here, assume that the path 1 is a wired communication link, and a branch cable is provided therein. Also assume that the terminal impedance of the branch cable does not match. In this case, a reflection wave occurs in the branch cable, and the receiver therefore receives signals from both of the paths 1 and 2. In a wireless communication, a similar state occurs under a multi-path environment.

Figure 9B:
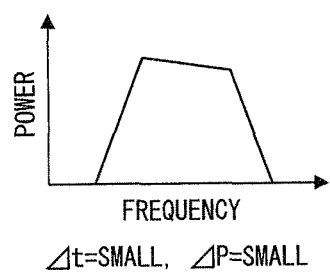
Figure 9C:
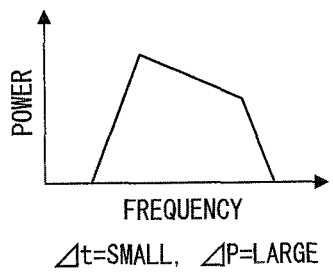
Figure 9D:
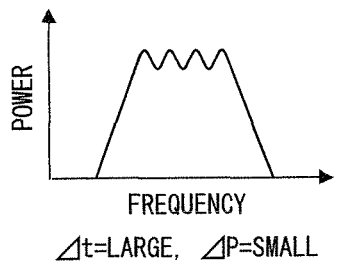
Figure 9E:
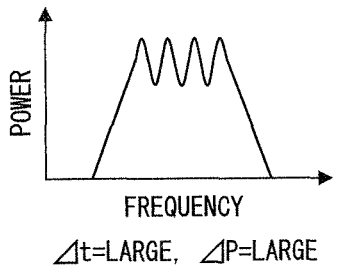

The quality of the reception signal at the receiver depends on a difference (Δt) between the transmission delays of the paths 1 and 2, and the power ratio (Δp) of the signal received via the path 1 to that received via the path 2. For example, FIG. 9B shows a spectrum implemented when the delay difference is small, and the power of the reflection wave signal is sufficiently low with respect to a principal wave signal. FIG. 9C shows a spectrum implemented when the delay difference is small, and the power of the reflection wave signal is high to a certain degree. FIG. 9D shows a spectrum implemented when the delay difference is large, and the power of the reflection wave signal is sufficiently low with respect to the principal wave signal. FIG. 9E shows a spectrum implemented when the delay difference is large, and the power of the reflection wave signal is high to a certain degree.

The FIR equalizer 11 according to this embodiment is provided to correct a distortion of a signal as described above. A distortion occurring when the delay difference is small can be corrected with a small number of taps. In contrast, for a distortion occurring when the delay difference is large, the number of taps must be incremented.

FIG. 10 is a diagram showing a fundamental configuration of the complex FIR filter 51. To the complex FIR filter 51, I-Q channel signals are input, and also the tap coefficients A(0) to A(n) and B(0) to B(n) are provided as described above. In FIG. 10, the function to change the number of taps is omitted. A complex FIR filter having the function to change the number of taps will be illustrated later.

The complex FIR filter 51 includes an I-channel circuit and Q-channel circuit. The I-channel circuit includes multipliers (a0/b0, a1/b1, a2/b2, . . . , an/bn), delay elements T, and adder circuits 61 and 61b. An I-channel signal is input to a pair of multipliers a0/b0. An I-channel signal delayed by one symbol time is input to another pair of multipliers a1/b1. An I-channel signal further delayed by one symbol time is input to a further pair of multipliers a2/b2. Similarly, I-channel signals sequentially delayed by one symbol time are input to the multipliers a3/b3 to an/bn. Each "T" shown in FIG. 10 indicates one symbol delay element.

The multiplier a0 multiplies the I-channel signal by the tap coefficient A(0), whereas the multiplier b0 multiplies the I-channel signal by the tap coefficient B(0). The multiplier a1 multiplies the delayed I-channel signal by the tap coefficient A(1), whereas the multiplier b1 multiplies the delayed I-channel signal by the tap coefficient B(1). Similarly, each of the multipliers multiplies the I-channel signal by a corresponding tap coefficient. The adder circuit 61a adds up the multiplication results of the multipliers a0 to an. Similarly, the adder circuit 61b adds up the multiplication results of the multipliers b0 to bn.

The configuration of the Q-channel circuit is identical to the above described I-channel circuit. However, the Q-channel signal is multiplied by the tap coefficients A(0) to A(n) and B(0) to B(n) in the Q-channel circuit. Adder circuits 61c and 61d output addition results equivalent to those of the adder circuits 61a and 61b.

An adder 62a adds and outputs the computation results of the adder circuits 61a and 61c. The output signal of the adder 62a is distortion-corrected I-channel signal. An adder 62b adds and outputs the computation results of the adder circuits 61b and 61d. The output signal of the adder 62b is distortion-corrected Q-channel signal.

Assuming that only one of the tap coefficients A(0) to A(n) is set to "1" and all the other tap coefficients are set to "0" in the complex FIR filter having the above described configuration, the input signal is output unchanged. Namely, "Iin=Iout" and "Qin=Qout" are obtained. This state is equivalent to the setting of the FIR equalizer 11 to OFF.

Additionally, the number of taps actually used to correct a distortion can be changed by forcibly providing "0" as a tap coefficient. Assume that the tap coefficients other than A(n/2−1), A(n/2), and A(n/2+1) among the coefficients A(0) to A(n) are set to "0", and the coefficients other than B(n/2−1), B(n/2), and B(n/2+1) among the coefficients B(0) to B (n) are set to "0". In this case, the number of taps actually used to correct the distortion results in "3". "n" is assumed to be an even number.

Figure 11:
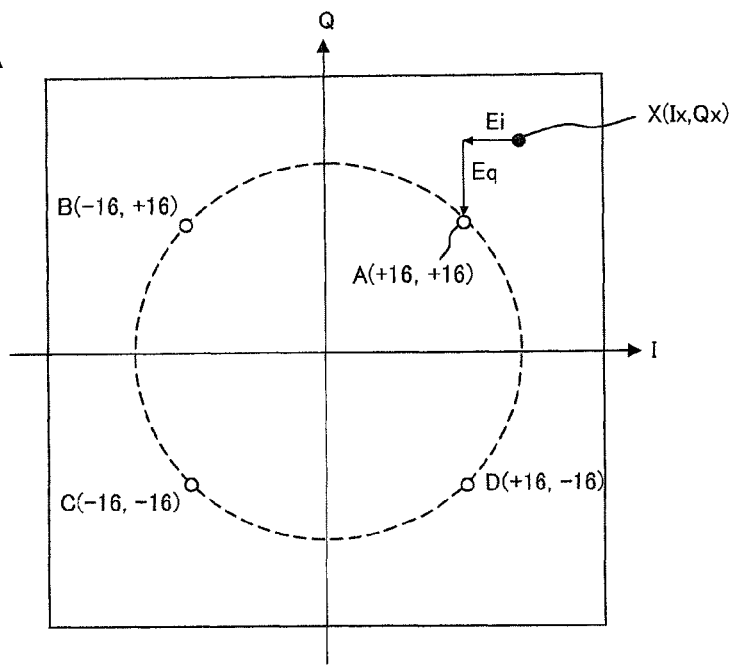
FIGS. 11A and 11B are schematic diagrams for explaining the operations of a decision unit.

FIGS. 11A and 11B are schematic diagrams for explaining the operations of the decision unit 52. Here, assume that the modulation method is QPSK. Also assume that a signal obtained with QPSK is ideally represented as any one of signal points A(+16,+16), B(−16,+16), C(−16,−16), and D(+16,−16) on a phase plane shown in FIG. 11A.

A modulation signal is normally distorted on a transmission path. A distortion includes changes in a phase and an amplitude. In FIG. 11A, the signal to be detected as the signal point A is detected as a signal point X(Ix, Qx). Namely, the symbol detected as the signal point X has an error of "Ei" in the direction of the I axis, and an error of "Eq" in the direction of the Q axis.

FIG. 11B shows the output signals (the I-channel decision signal Di, the Q-channel decision signal Dq, the I-channel error signal Ei, and the Q-channel error signal Eq) of the decision unit 52. The decision signals Di and Dq represent the (positive/negative) signs of a detected signal point. In this embodiment, the coordinates of an ideal signal point closest to a detected signal point are output. For example, if the signal point X shown in FIG. 11A is detected, "+16" and "+16" are obtained respectively as the decision signals Di and Dq. Moreover, the error signals Ei and Eq are calculated respectively with "Ei=Di−Ix" and "Eq=Dq−Qx".

Figure 12:
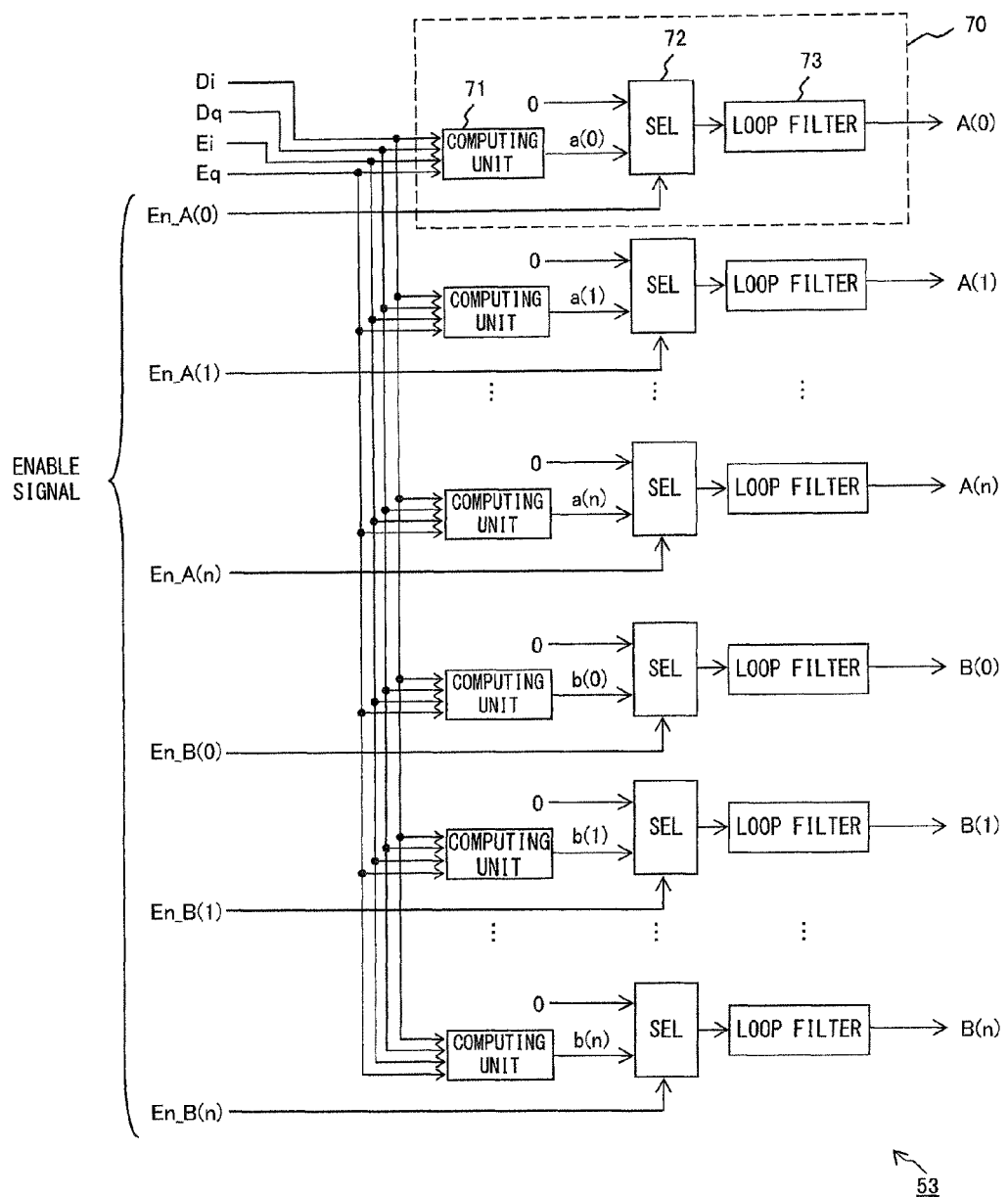
FIG. 12 is a block diagram showing a configuration of a tap coefficient computing unit.

FIG. 12 is a block diagram showing a configuration of the tap coefficient computing unit 53. The tap coefficient computing unit 53 includes coefficient calculating units 70, which respectively correspond to the tap coefficient A(0) to A(n) and B(0) to B(n), in order to generate the coefficients. Each of the coefficient calculating units 70 has identical configuration, and includes a computing unit 71, a selector 72, and a loop filter 73. To each of the coefficient calculating units 70, the decision signals Di and Dq, and the error signals Ei and Eq are provided. Additionally, respectively corresponding enable signals En_A(0) to En_A(n) and En_B(0) to En_B(n) are provided to the coefficient calculating units 70. Each of the enable signals is equivalent to the above described tap number instruction, and generated by the control circuit 12.

Operations of the coefficient calculating unit 70 for generating the tap coefficient A(0) areas follows. The computing unit 71 generates a tentative tap coefficient a(0) on the basis of the decision signals Di and Dq, and the error signals Ei and Eq. A configuration and operations of the computing unit 71 will be described in detail later. The tentative tap coefficient a(0) is provided to a first input terminal of the selector 72, "0" is provided to a second input terminal of the selector 71, and the enable signal En_A(0) is provided to a selection terminal of the selector 72. The selector 72 selects the first input terminal (the tentative tap coefficient a(0)) if the enable signal En_A(0) is "1", or selects the second input terminal ("0") if the enable signal En_A(0) is "0". The loop filter 73 smoothes the output of the selector 72. The output signal of the loop filter 73 is the tap coefficient A(0).

Operations of the other coefficient calculating units are fundamentally identical to those of the coefficient calculating unit 70 for generating the tap coefficient A(0). However, the selector 72 of each of the coefficient calculating units selects an input signal instructed by a corresponding one of the enable signals En_A(0) to En_A(n) and En_B(0) to En_B(n).

Assume that only the enable signals En_A(0) and En_B(0) are "1", and all the other enable signals are "0" in the tap coefficient computing unit 53 having the above described configuration. In this case, one pair of the tap coefficients A(0)/B(0) has a value calculated by the computing unit 71, and the other tap coefficients result in "0". Therefore, the number of taps that the FIR equalizer 11 uses to correct a distortion results in "1". Also assume that only the enable signals En_A(0), En_B(0), En_A(1), and En_B1(1) are "1", and all the other enable signals are "0". In this case, two pairs of the tap coefficients A(0)/B(0) and A(1)/B(1) have values calculated by the computing unit 71, and all the other tap coefficients result in "0". Therefore, the number of taps that the FIR equalizer 11 uses to correct a distortion results in "2".

FIG. 13 is a diagram showing a configuration of the computing units in the tap coefficient computing unit 53. Here, the computing units that generate the tentative tap coefficients a(0) to a(n) and b(0) to b(n) are represented as one circuit. Each "T" indicates a delay element.

Decision signals Di and Dq, and error signals Ei and Eq are provided to the computing units for each symbol. The tentative tap coefficients a(0) to a(n) are generated as follows. Here, "n" is assumed to be an even number.

A tentative tap coefficient a(n/2) is obtained with "Di(0)×Ei(0)+Dq(0)×Eq(0)". Here, Di(0), Ei(0), Dq(0), and Eq(0) are newly provided decision signals Di and Dq, and error signals Ei and Eq.

A tentative tap coefficient a(n/2−1) is obtained with "Di(0)×Ei(1)+Dq(0)×Eq(1)". Here, Ei(1) and Eq(1) are the error signals Ei and Eq that are respectively provided for the immediately previous symbol. Moreover, a tentative tap coefficient a(n/2−2) is obtained with "Di(0)×Ei(2)+Dq(0)×Eq(2)". Here, Ei(2) and Eq(2) are the error signals Ei and Eq that are respectively provided for the symbol at the timing of two-symbol period earlier. Also tentative tap coefficients a(n/2−3) to a(0) are calculated in a similar manner.

A tentative tap coefficient a(n/2+1) is obtained with "Di(1)×Ei(0)+Dq(1)×Eq(0)". Here, Di(1) and Dq(1) are the decision signals Di and Dq that are respectively provided for the immediately previous symbol. Moreover, a tentative tap coefficient a(n/2+2) is obtained with "Di(2)×Ei(0)+Dq(2)×Eq(0)". Here, Di(2) and Dq(2) are the decision signals Di and Dq that are respectively provided for the symbol at the timing of two-symbol period earlier. Also tentative tap coefficients a(n/2+3) to a(n) a recalculated in a similar manner.

The tentative tap coefficients b(0) to b(n) are fundamentally calculated with computations similar to those of the tentative tap coefficients a(0) to a(n). However, "−Di" is used instead of "Di" when the tentative tap coefficients b(0) to b(n) are calculated.

The function to dynamically change the number of taps used by the FIR equalizer 11 is implemented by the tap coefficient computing unit in the embodiment shown in FIG. 12. However, the present invention is not limited to this configuration. Namely, the function to change the number of taps may be implemented with a different configuration.

FIG. 14 is a diagram showing a configuration of the complex FIR filter 51 having the function to change the number of taps. The fundamental configuration of the complex FIR filter is as described with reference to FIG. 10. Note that the enable signals En_A(0) to En_A(n) and En_B(0) to En_B(n), which are generated by the control circuit 12, are provided to the complex FIR filter.

In an I-channel circuit, the output signals of multipliers a0 to an are respectively provided to the first input terminals of corresponding selectors (SEL) 81, "0" is respectively provided to the second input terminals of the selectors 81, and the enable signals En_A(0) to En_A(n) are respectively provided to the selection terminals of the selectors 81. Each of the selectors 81 selects the first input terminal (provided tap coefficient) if the enable signal En is "1", or selects the second input terminal ("0") if the enable signal En is "0".

Also the output signals of the multipliers b0 to bn are similarly provided to the corresponding selectors although they are not shown for clarity of illustration. However, these selectors are controlled with the enable signals En_B(0) to En_B(n). Also the configuration and the operations of a Q-channel circuit are fundamentally identical to those of the I-channel circuit.

For example, if only the enable signals En_A(n/2−1) to En_A(n/2+1) and En_B(n/2−1) to En_B(n/2+1) are set to "1" in the complex FIR filter having the above described configuration, only the tap coefficients A(n/2−1) to A(n/2+1) and B(n/2−1) to B(n/2+1) are enabled. Namely, the number of taps used to compensate for a distortion in the FIR equalizer 11 results in "3". Similarly, for example, if only the enable signals En_A(n/2−2) to En_A(n/2+2) and En_B(n/2−2) to En_B(n/2+2) are set to "1", the number of taps used in the FIR equalizer 11 results in "5".

As described above, the number of taps to be used can be changed by using the enable signal En in the receiving apparatus 10 according to the embodiment. For example, in the sequence shown in FIG. 4, the number of taps can be changed by measuring the times T1, T2, . . . with the timer, and by switching an enable signals at each timing when the timer expires.

Figure 15:
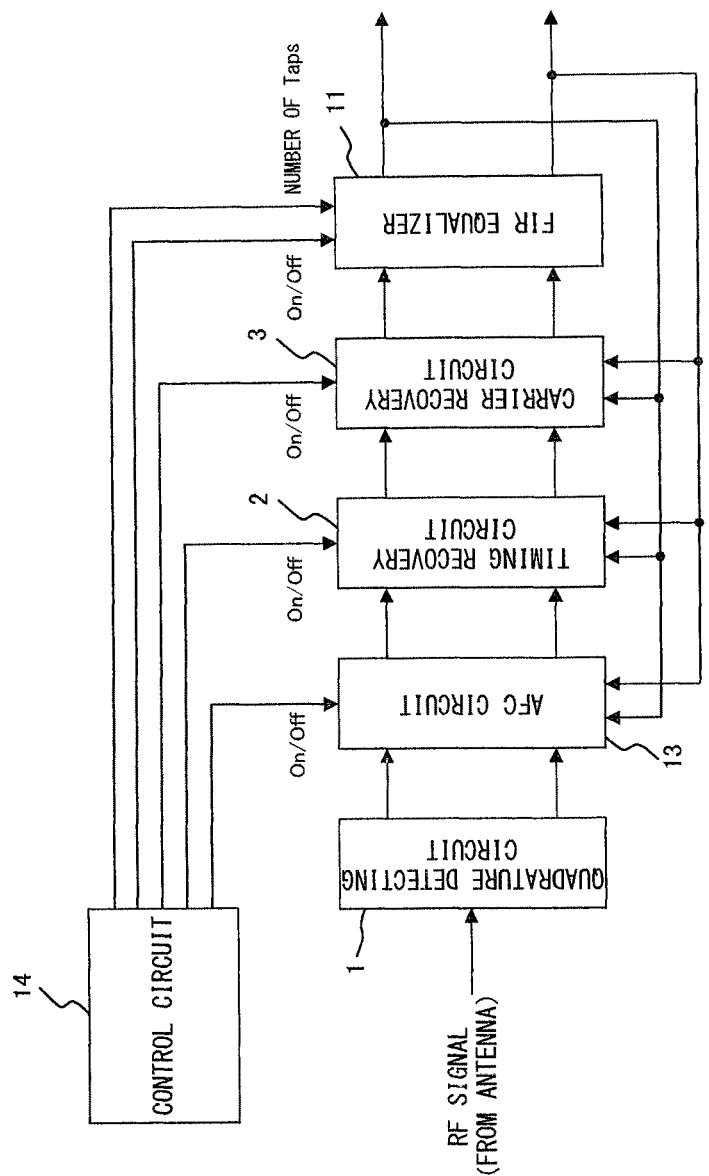
FIG. 15 is a block diagram showing a configuration of a receiving apparatus according to a second embodiment.

FIG. 15 is a block diagram showing a configuration of a receiving apparatus according to a second embodiment. A fundamental configuration of the receiving apparatus according to the second embodiment is identical to the receiving apparatus 10 shown in FIG. 3. However, an AFC (Automatic Frequency Control) circuit 13 is provided on the input side of the timing recovery circuit 2. The AFC circuit 13 roughly adjusts the frequency of an input signal. Namely, the AFC circuit 13 corrects a frequency shift with low precision. Then the carrier recovery circuit 3 corrects the frequency shift with high precision.

A control circuit 14 also controls the AFC circuit 13 in addition to the timing recovery circuit 2, the carrier recovery circuit 3, and an FIR equalizer 11.

Figure 16:
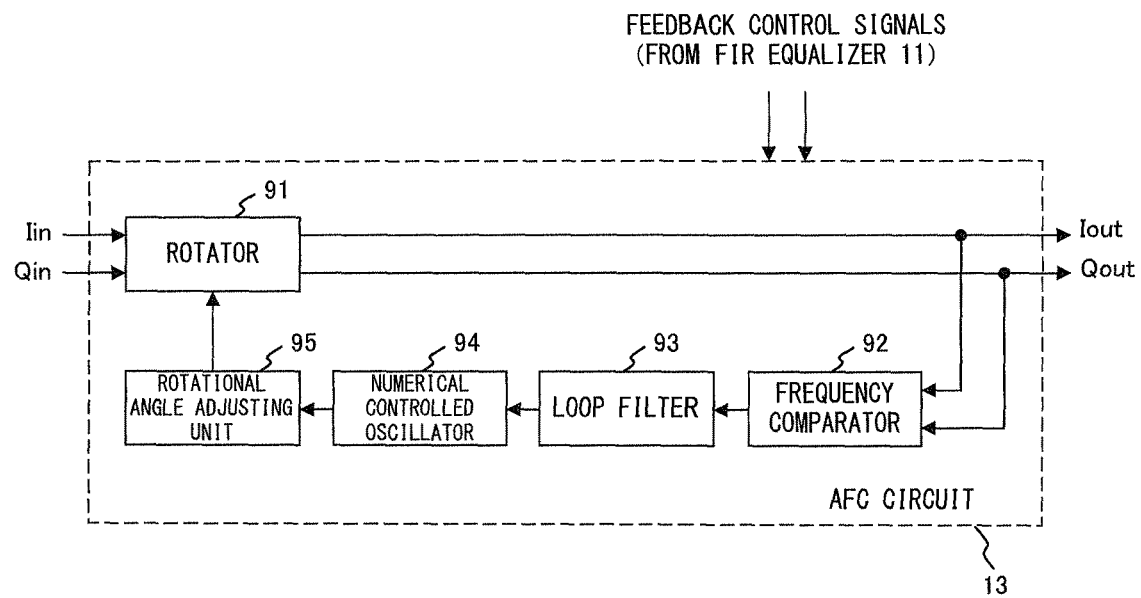
FIG. 16 is a block diagram showing a configuration of an AFC circuit.

FIG. 16 is a block diagram showing the configuration of the AFC circuit 13. The configuration of the AFC circuit 13 is analogous to the carrier recovery circuit 3 shown in FIG. 7. Namely, the AFC circuit 13 includes a rotator 91, a frequency comparator 92, a loop filter 93, a numerical controlled oscillator 94, and a rotational angle adjusting unit 95. The AFC circuit 13 corrects the frequency shifts of I-Q channel signals with precision lower than the carrier recovery circuit 3.

I-Q channel signals, the timings of which are recovered by the timing recovery circuit 2, are input to the rotator 91. The rotator 91 shifts the phase of an input signal by θ in accordance with a rotational angle instruction signal generated by the rotational angle adjusting unit 95. As a result, the frequency of the input signal is adjusted. Operations of the frequency comparator 92, the loop filter 93, and the numerical controlled oscillator 94 are respectively analogous to the phase comparator 42, the loop filter 43, and the numerical controlled oscillator 44 of the carrier recovery circuit 3. Namely, the frequency comparator 92 detects a frequency error of an input signal with respect to an ideal frequency. The loop filter 93 smoothes the output signal of the frequency comparator 92. The numerical controlled oscillator 94 oscillates at a frequency corresponding to the output signal of the loop filter 93. This oscillation frequency is nearly equivalent to a frequency shift (namely, a difference between the frequency of the carrier wave and the oscillation frequency of the local oscillator). The rotational angle adjusting unit 95 generates the rotational angle instruction signal in accordance with the output value of the numerical controlled oscillator 94.

The AFC circuit 13 can use the output signals of the FIR equalizer 11 (namely, the distortion-corrected I-Q channel signals) as feedback control signals. In this case, for example, input signals to the rotator 91 may be corrected with the feedback control signals. Alternatively, the rotational angle instruction signal obtained by the rotational angle adjusting unit 95 may be corrected with the feedback control signals. In either case, the lock time of the AFC circuit 13 at an initial operation is reduced with this feedback control.

Figure 17:
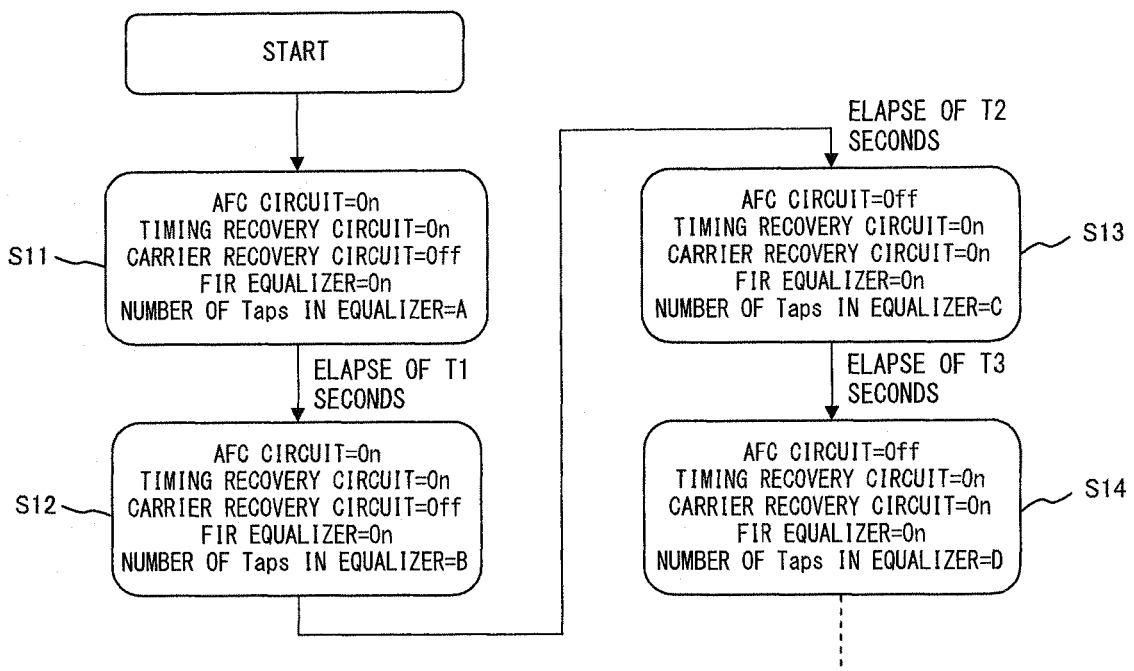
FIG. 17 is a flowchart showing the operations of the receiving apparatus according to the second embodiment.

FIG. 17 is a flowchart showing the operations of the receiving apparatus according to the second embodiment. The process of this flowchart is executed by the control circuit 14 at the start of reception of a modulation signal (or at the power-up of the receiving apparatus).

In step S11, the AFC circuit 13, the timing recovery circuit 2, and the FIR equalizer 11 are set to ON. In the meantime, the carrier recovery circuit 3 is set to OFF. Moreover, the number of taps used by the FIR equalizer 11 is set to "A". As a result, the FIR equalizer 11 operates with "the number of taps=A". "A" is a predetermined integer. Furthermore, a timer is activated to measure a "time T1". As a result of executing step S11, the AFC circuit 13 starts to roughly adjust a frequency, and the timing recovery circuit 2 starts to recover timing. Moreover, the FIR equalizer 11 starts to correct a distortion with "the number of taps=A".

When the timer expires after the time T1 elapses, the number of taps used by the FIR equalizer 11 is set to "B" in step S12. As a result, the FIR equalizer 11 operates with "the number of taps=B". "B" is an integer larger than "A". Then, the timer is reactivated to measure a "time T2".

When the timer expires after the time T2 elapses, the AFC circuit 13 is suspended, and the carrier recovery circuit 3 is started to operate in step S13. Additionally, the number of taps used by the FIR equalizer 11 is set to "C". As a result, the FIR equalizer 11 operates with "the number of taps=C". "C" is an integer larger than "B". Then, the timer is reactivated to measure a time "T3".

When the timer expires after the time T3 elapses, the number of taps used by the FIR equalizer 11 is set to "D". As a result, the FIR equalizer 11 operates with "the number of taps=D". "D" is an integer larger than "C". Thereafter, a normal reception operation is continued in this state.

As described above, a frequency shift is corrected with low precision by using the AFC circuit 13 at the start of reception of a modulation signal in the receiving apparatus according to the second embodiment. Thereafter, the frequency shift is corrected with high precision by using the carrier recovery circuit 3. Note that the number of taps used by the FIR equalizer 11 is incremented gradually as time elapses similar to the receiving apparatus 10 shown in FIG. 3. Accordingly, with the configuration according to the second embodiment, the distortion correction operation is executed in parallel with the AFC operation. Therefore, a frequency can be roughly adjusted more quickly and accurately if a distortion of an input signal is caused by a small delay difference (see FIGS. 9B and 9C).

Suitable values are assumed to be predetermined, for example, with a simulation, etc. respectively as the numbers of taps "A" to "C" . . . , and the times "T1" to "T3" . . . . The number of taps "D" is the total number of taps of the FIR equalizer 11.

Figure 18:
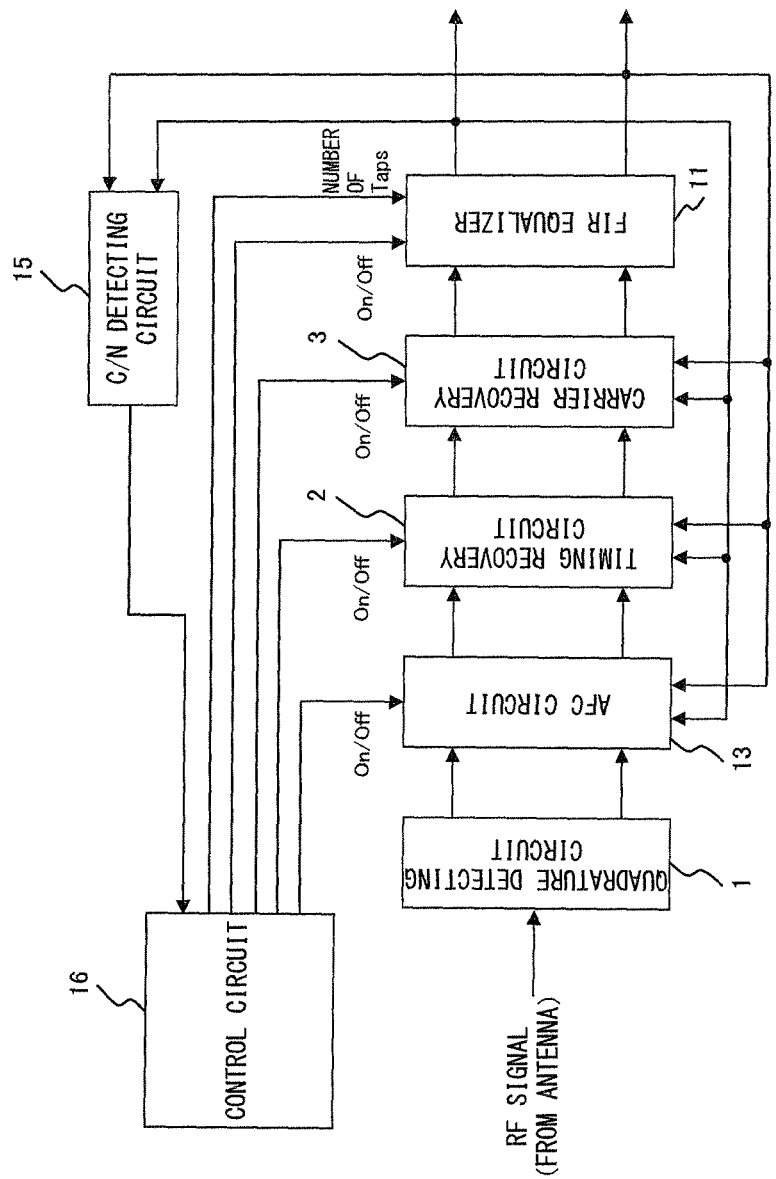
FIG. 18 is a block diagram showing a configuration of a receiving apparatus according to a third embodiment.

FIG. 18 is a block diagram showing a configuration of a receiving apparatus according to a third embodiment. A fundamental configuration of the receiving apparatus according to the third embodiment is identical to the second embodiment shown in FIG. 15. However, the receiving apparatus according to the third embodiment includes a C/N detecting circuit 15 for detecting a Carrier-to-Noise ratio (C/N: Carrier/Noise) of output signals of the FIR equalizer 11. A control circuit 16 controls the AFC circuit 13, the timing recovery circuit 2, the carrier recovery circuit 3, and the FIR equalizer 11 on the basis of the C/N detected by the C/N detecting circuit 15.

FIGS. 19A to 19C are schematic diagrams for explaining the configuration and the operations of the C/N detecting circuit 15. The C/N detecting circuit 15 includes an amplitude error detecting unit 101, and an amplitude error integrating unit 102 as shown in FIG. 19A. The amplitude error detecting unit 101 obtains I-Q channel data, for example, for each symbol, and detects the amplitude of a modulation signal. Assuming that the I-channel data and Q-channel data are respectively represented as "I" and "Q" as shown in FIG. 19B, the amplitude of the signal is expressed by the following equation.

$$\text{amplitude} = (I^2 + Q^2)^{1/2}$$

The amplitude error detecting unit 101 calculates a difference (namely, an error) between a calculated amplitude value and a reference amplitude value. The reference amplitude value is assumed to be predetermined at the design phase of the system. The amplitude error integrating unit 102 cumulatively adds amplitude error data obtained by the amplitude error detecting unit 101 for a predetermined duration. Namely, the amplitude error data is integrated. Then, the C/N detecting circuit 15 outputs the integration result as C/N indicator data. The C/N detecting circuit 15 may have, for example, the configuration recited in the above described Patent Document 1.

If the C/N is low (namely, if the amplitude of a modulation signal is significantly varied by noise), the C/N indicator data output from the C/N detecting circuit 15 is large as shown in FIG. 15C. Conversely, if the C/N is high (namely, if noise is low and the amplitude of a modulation signal is almost the reference amplitude), the C/N indicator data is small.

Figure 20A:
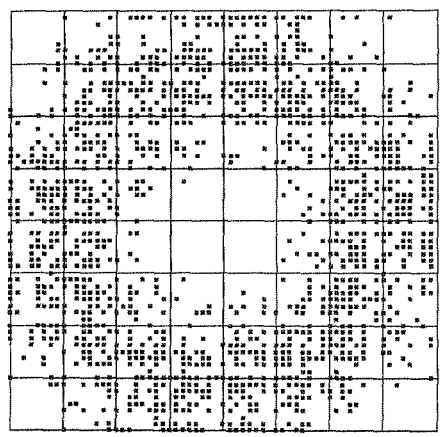
FIGS. 20A and 20B are schematic diagrams showing I-Q constellations of a PSK modulation signal.
Figure 20B:
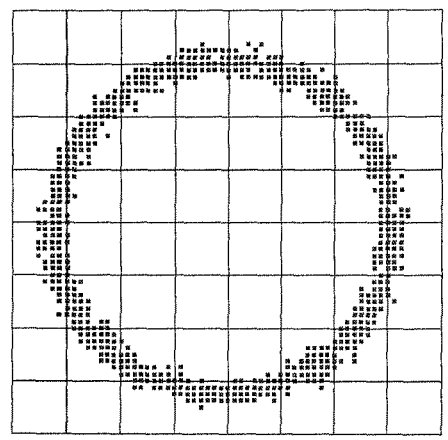

FIGS. 20A and 20B are schematic diagrams showing I-Q constellations of a PSK modulation signal. FIG. 20A shows the state where the C/N is low, whereas FIG. 20B shows the state where the C/N is high. Both of FIGS. 20A and 20B show the states where a carrier is not recovered.

Here, the convergence times of the AFC circuit 13, the timing recovery circuit 2, and the FIR equalizer 11 depend on the C/N value detected by the C/N detecting circuit 15. Namely, the convergence time is long if the C/N is low, or the convergence time is short if the C/N is high. Therefore, the convergence time is estimated based on a C/N value, and the increment speed of the number of taps is adjusted in accordance with the estimated times (namely, the length of time required to make a transition from the start of reception to the normal reception mode).

Figure 21:
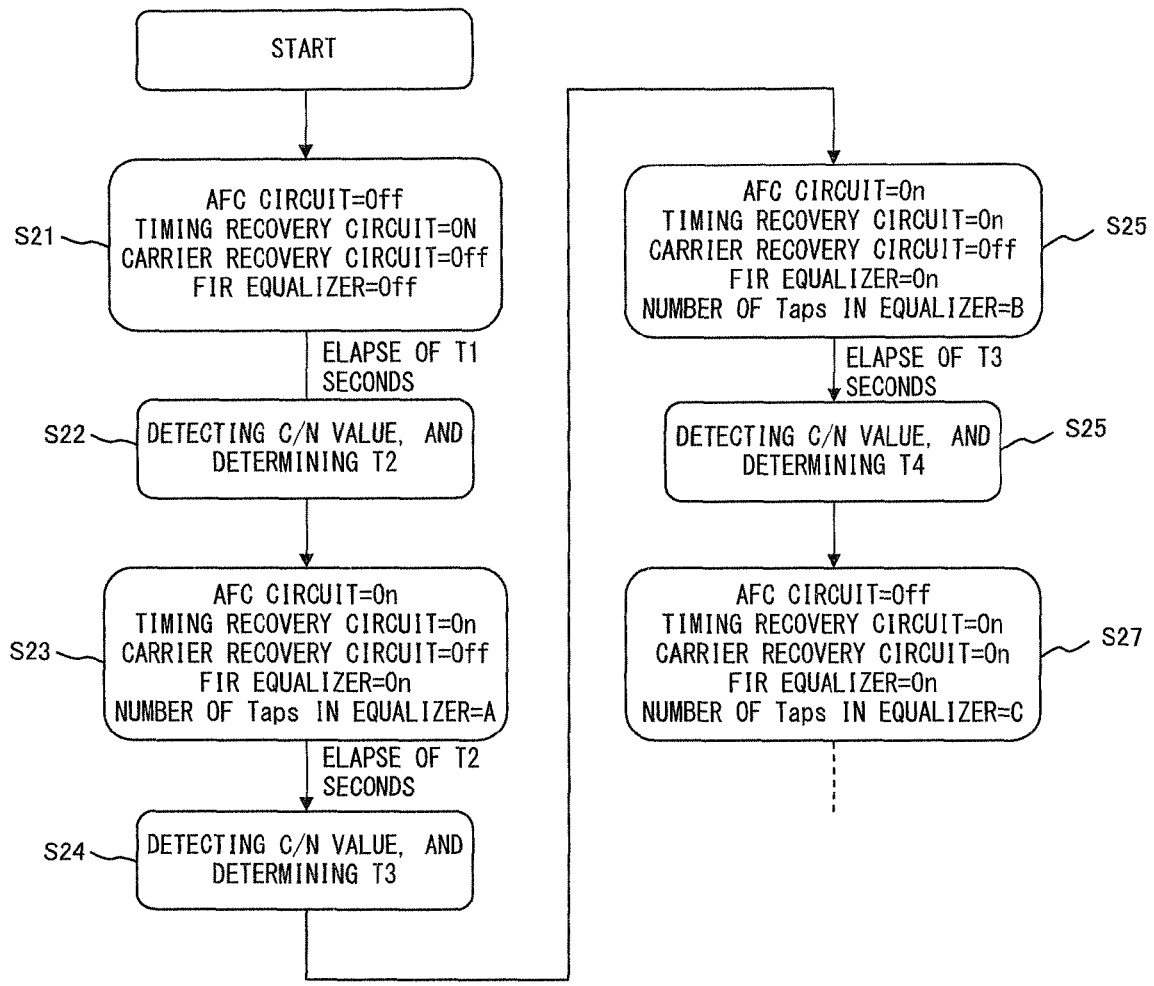
FIG. 21 is a flowchart showing the operations of the receiving apparatus according to the third embodiment.

FIG. 21 is a flowchart showing the operations of the receiving apparatus according to the third embodiment. The process of this flowchart is executed by the control circuit 16 at the start of reception of a modulation signal (or at the power-up of the receiving apparatus).

In step S21, the timing recovery circuit 2 is set to ON. In the meantime, the AFC circuit 13, the carrier recovery circuit 3, and the FIR equalizer 11 are set to OFF. Then, a timer is activated to measure a "time T1". Namely, only a timing recovery operation is performed at the start of reception until the time T1 elapses.

When the timer expires after the time T1 elapses, the C/N detecting circuit 15 is caused to detect C/N in step S22. Then, a "time T2" to be used in step S23 is determined in accordance with the C/N detected by the C/N detecting circuit 15.

In step S23, the AFC circuit 13 and the FIR equalizer 11 are started to operate. Additionally, the number of taps used by the FIR equalizer 11 is set to "A". As a result, the FIR equalizer 11 operates with "the number of taps=A". "A" is a predetermined integer. Moreover, the timer is reactivated to measure a "time T2".

When the timer expires after the time T2 elapses, the C/N detecting circuit 15 is caused to detect C/N. Then, a "time T3" to be used in step S25 is determined in accordance with the C/N detected by the C/N detecting circuit 15.

In step S25, the number of taps used by the FIR equalizer 11 is set to "B" in step S25. As a result, the FIR equalizer 11 operates with "the number of taps=B". "B" is a predetermined integer larger than "A". Then, the timer is reactivated to measure a "time T3".

When the timer expires after the time T3 elapses, the C/N detecting circuit 15 is caused to detect C/N. Then, a "time T4" to be used in step S27 is determined in accordance with the C/N detected by the C/N detecting circuit 15.

In step S27, the AFC circuit 13 is suspended, and the carrier recovery circuit 3 is started to operate. Moreover, the number of taps used by the FIR equalizer 11 is set to "C". As a result, the FIR equalizer 11 operates with "the number of taps=C". "C" is a predetermined integer larger than "B". Furthermore, the timer is reactivated to measure a "time T4". Thereafter, the number of taps used by the FIR equalizer 11 is incremented gradually to its maximum number. After the number of taps used by the FIR equalizer 11 reaches its maximum number, the receiving apparatus 10 receives a modulation signal in a normal operation mode.

As described above, the times T1, T2, T3, . . . are determined in accordance with C/N in the receiving apparatus according to the third embodiment. Namely, for example, if the C/N is high (namely, if noise is low), T1, T2, T3, . . . are set to small values compared with the case where the C/N is low. Accordingly, the length of time required to make a transition from the start of reception to the normal operation mode can be reduced. This helps reduce the waiting time of a user at the start of reception.

Suitable values are assumed to be predetermined with a simulation, etc. as the numbers of taps "A" to "C" . . . , and correspondences between C/N values and the times "T2" to "T4" . . . are assumed to be obtained beforehand with a simulation, etc.

Figure 22:
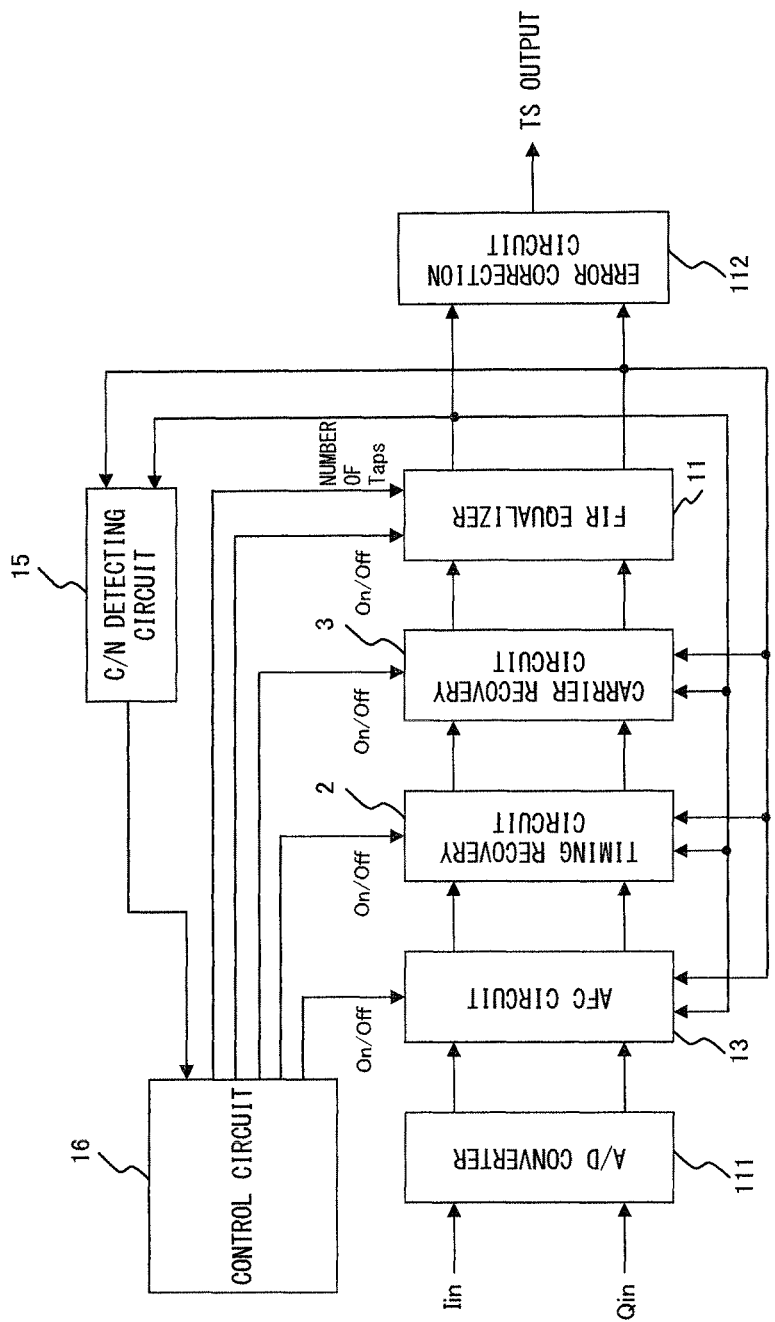
FIG. 22 is a block diagram showing a configuration of a demodulating circuit according to the embodiments.

FIG. 22 is a block diagram showing a configuration of a demodulating circuit according to the embodiments. In FIG. 22, the AFC circuit 13, the timing recovery circuit 2, the carrier recovery circuit 3, the FIR equalizer 11, the C/N detecting circuit 15, and the control circuit 16 are as described above. An A/D converter 111 converts I-Q channel signals into digital data. An error correction circuit 112 outputs a data string in a TS format after regenerating transmission data from I-Q channel signals output from the FIR equalizer 11, and executing an error correction process.

This demodulating circuit is formed, for example, on one semiconductor chip. The example shown in FIG. 22 assumes the receiving apparatus according to the third embodiment. However, a demodulating circuit corresponding to the receiving apparatus according to the first or the second embodiment may be implemented.

FIG. 23 is a block diagram showing a configuration of a satellite broadcasting receiving system according to the embodiments. In FIG. 23, a satellite broadcasting signal is an n-phase PSK modulation signal, and input to a set top box via an antenna. The set top box includes an RF unit 121, a demodulating LSI 122, an MPEG decoder 123, a front panel controller 124, a memory 125, and an A/V amplifier 126.

The RF unit 121 is equivalent to the quadrature detecting circuit 1 shown in FIG. 3, and generates I-Q channel signals. The demodulating LSI 122 has the configuration shown in FIG. 22, and regenerates a data string in the TS format by demodulating a received modulation signal. The MPEG decoder 123 regenerates image and audio data by using the memory 125 in accordance with an instruction issued from the front panel controller 124. The A/V amplifier 126 amplifies the regenerated audio and video data. A display device 130 displays the regenerated image, and outputs the regenerated audio.

The receiving apparatuses according to the above described embodiments correct a distortion of a signal by using the FIR equalizer having a FIR filter. However, the present invention is not limited to this configuration. A different digital filter is available as a replacement for the FIR equalizer.

What is claimed is:

1. A receiving apparatus, comprising:
    a timing recovery circuit configured to recover symbol timing of a modulation signal;
    a carrier recovery circuit configured to correct a frequency shift of an output signal of the timing recovery circuit;
    a digital equalizer that has a plurality of taps and is configured to correct a distortion of an output signal of the carrier recovery circuit;
    a control circuit configured to dynamically control the number of taps used in the digital equalizer by providing a first operation mode at the start of reception of the modulation signal and a second operation mode; and
    an automatic frequency control circuit configured to be provided on an input side of the timing recovery circuit and configured to roughly adjust a frequency of the modulation signal, wherein
    the control circuit is configured to provide, at the start of reception of the modulation signal, the first operation mode in which the automatic frequency control circuit operates and the operation of the carrier recovery circuit is suspended, and is configured to provide the second operation mode in which the operation of the automatic frequency control circuit is suspended and the carrier recovery circuit operates after the first operation mode has been provided for a certain period.

2. The receiving apparatus according to claim 1, wherein the digital equalizer is a Finite Impulse Response (FIR) equalizer including an FIR filter.

3. The receiving apparatus according to claim 1, wherein:
the digital equalizer comprises
an FIR filter, and
a tap coefficient computing unit configured to generate a tap coefficient to be provided to a tap of the FIR filter using an output signal of the FIR filter, and
the control circuit is configured to generate a control signal for correcting a tap coefficient to be provided to an unused tap to zero.

4. The receiving apparatus according to claim 1, wherein the modulation signal is a Phase Shift Keying (PSK) modulation signal.

5. The receiving apparatus according to claim 1, further comprising
a carrier-to-noise ratio detecting circuit configured to detect a carrier-to-noise ratio of an output signal of the digital equalizer, wherein
the control circuit is configured to increment the number of taps used in the digital equalizer in accordance with the carrier-to-noise ratio detected by the carrier-to-noise ratio detecting circuit.

6. The receiving apparatus according to claim 5, wherein:
the carrier-to-noise ratio detecting circuit is configured to detect the carrier-to-noise ratio when the digital equalizer operates with N taps; and
the control circuit is configured to determine a length of time, during which the digital equalizer is to operate with M taps, in accordance with the detected the carrier-to-noise ratio both N and M are integers, and M is larger than N.

7. A receiving apparatus, comprising:
a timing recovery circuit configured to recover symbol timing of a modulation signal;
a carrier recovery circuit configured to correct a frequency shift of an output signal of the timing recovery circuit;
a digital equalizer that has a plurality of taps and is configured to correct a distortion of an output signal of the carrier recovery circuit;
a control circuit configured to dynamically control the number of taps used in the digital equalizer; and
an automatic frequency control circuit that is configured to be provided on an input side of the timing recovery circuit and that is configured to roughly adjust a frequency of the modulation signal, wherein
the control circuit is further configured to provide, at the start of reception of the modulation signal, a first operation mode in which the automatic frequency control circuit operates and the operation of the carrier recovery circuit is suspended, and is configured to provide a second operation mode in which the operation of the automatic frequency control circuit is suspended and the carrier recovery circuit operates after the first operation mode has been provided for a certain period, wherein
the control circuit is configured to increment the number of taps used in the digital equalizer as time elapses from the start of reception of the modulation signal.

8. A receiving apparatus, comprising:
a timing recovery circuit configured to recover symbol timing of a modulation signal;
a carrier recovery circuit configured to correct a frequency shift of an output signal of the timing recovery circuit;
a digital equalizer that has a plurality of taps and is configured to correct a distortion of an output signal of the carrier recovery circuit;
a control circuit configured to dynamically control the number of taps used in the digital equalizer; and
an automatic frequency control circuit configured to be provided on an input side of the timing recovery circuit and configured to roughly adjust a frequency of the modulation signal, wherein
the control circuit is configured to provide, at the start of reception of the modulation signal, a first operation mode in which the automatic frequency control circuit operates and the operation of the carrier recovery circuit is suspended, and is configured to provide a second operation mode in which the operation of the automatic frequency control circuit is suspended and the carrier recovery circuit operates after the first operation mode, and
the control circuit is further configured to increment the number of taps used in the digital equalizer during the first operation mode.

9. A receiving apparatus, comprising:
a timing recovery circuit configured to recover symbol timing of a modulation signal;
a carrier recovery circuit configured to correct a frequency shift of an output signal of the timing recovery circuit;
a digital equalizer that has a plurality of taps and is configured to correct a distortion of an output signal of the carrier recovery circuit;
a control circuit configured to dynamically control the number of taps used in the digital equalizer; and
an automatic frequency control circuit configured to be provided on an input side of the timing recovery circuit and configured to roughly adjust a frequency of the modulation signal, wherein
the control circuit is configured to provide, at the start of reception of the modulation signal, a first operation mode in which the automatic frequency control circuit operates and the operation of the carrier recovery circuit is suspended, and is configured to provide a second operation mode in which the operation of the automatic frequency control circuit is suspended and the carrier recovery circuit operates after the first operation mode has been provided for a certain period, wherein
the control circuit is further configured to increment the number of taps used in the digital equalizer during the second operation mode.

10. A receiving method, comprising:
recovering symbol timing of a modulation signal;
correcting a frequency shift of the modulation signal whose symbol timing has been recovered, the correcting the frequency shift performed by using a carrier recovery circuit;
correcting a distortion of the modulation signal whose frequency shift has been corrected, the correction of the distortion performed by using a digital equalizer including a plurality of taps;
dynamically controlling the number of taps used in the digital equalizer, by providing a first operation mode at the start of reception of the modulation signal and a second operation mode; and
roughly adjusting a frequency of the modulation signal by using an automatic frequency control circuit, wherein
the first operation mode is a mode in which the automatic frequency control circuit operates and the operation of the carrier recovery circuit is suspended, and the second operation mode is a mode in which the operation of the automatic frequency control circuit is suspended and the carrier recovery circuit operates after the first operation mode has been provided for a certain period.

* * * * *